United States Patent
Konno

(10) Patent No.: US 12,032,248 B2
(45) Date of Patent: Jul. 9, 2024

(54) LIQUID CRYSTAL DISPLAY PANEL AND LIQUID CRYSTAL DISPLAY DEVICE

(71) Applicant: Shanghai Tianma Micro-Electronics Co., Ltd., Shanghai (CN)

(72) Inventor: Takayuki Konno, Kanagawa (JP)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 18/163,937

(22) Filed: Feb. 3, 2023

(65) Prior Publication Data
US 2023/0251533 A1 Aug. 10, 2023

(30) Foreign Application Priority Data

Feb. 10, 2022 (JP) ................................. 2022-019878
Oct. 27, 2022 (JP) ................................. 2022-172191

(51) Int. Cl.
*G02F 1/1343* (2006.01)
*G02F 1/1362* (2006.01)

(52) U.S. Cl.
CPC .. *G02F 1/134372* (2021.01); *G02F 1/136286* (2013.01)

(58) Field of Classification Search
CPC .................................................. G02F 1/1343
See application file for complete search history.

(56) References Cited

U.S. PATENT DOCUMENTS

| | | | |
|---|---|---|---|
| 2013/0128210 A1* | 5/2013 | Nagasawa | G02F 1/13452 349/151 |
| 2015/0085218 A1* | 3/2015 | Tomioka | G02F 1/133707 349/123 |
| 2016/0187735 A1* | 6/2016 | Xi | G02F 1/134336 349/139 |
| 2018/0210247 A1* | 7/2018 | Ono | G02F 1/136286 |
| 2020/0249534 A1 | 8/2020 | Wang et al. | |
| 2022/0019111 A1* | 1/2022 | Takatori | G02B 30/30 |

FOREIGN PATENT DOCUMENTS

JP 2018-120045 A 8/2018
JP 2020-513111 A 4/2020

* cited by examiner

*Primary Examiner* — Sang V Nguyen
(74) *Attorney, Agent, or Firm* — Sughrue Mion, PLLC

(57) ABSTRACT

A liquid crystal display panel includes a plurality of pixels. The pixels each include a pixel electrode, a common electrode, and a liquid crystal that rotates in-plane due to voltage applied by the pixel electrode and the common electrode. The pixel electrode includes a linear electrode. When an initial alignment direction of the liquid crystal for which dielectric anisotropy is positive, or a direction perpendicular to the initial alignment direction of the liquid crystal for which dielectric anisotropy is negative is defined as a predetermined first direction, at a boundary between pixels, of the plurality of pixels, that are adjacent to each other, a boundary line between the adjacent pixels, the linear electrode, and an end side of the linear electrode are inclined with respect to the predetermined first direction, and inclining directions with respect to the predetermined first direction of the boundary line, the linear electrode, and the end side are identical.

8 Claims, 18 Drawing Sheets

LIQUID CRYSTAL DISPLAY PANEL AND LIQUID CRYSTAL DISPLAY DEVICE

CROSS-REFERENCE TO RELATED APPLICATION

This application claims the benefit of Japanese Patent Application No. 2022-019878, filed on Feb. 10, 2022, and Japanese Patent Application No. 2022-172191, filed on Oct. 27, 2022, of which the entirety of the disclosures is incorporated by reference herein.

FIELD

The present disclosure relates generally to a liquid crystal display panel and a liquid crystal display device.

BACKGROUND

In the related art, liquid crystal display devices are known in which contrast is improved by stacking a plurality of liquid crystal display panels. For example, Unexamined Japanese Patent Application Publication No. 2018-120045 describes a liquid crystal display device in which a plurality of display panels is disposed stacked, and that displays an image on each of the display panels, wherein the liquid crystal display device includes a first display panel that displays a color image and a second display panel that displays a black and white image.

In Unexamined Japanese Patent Application Publication No. 2018-120045, the pixel electrodes of the second display panel have an outer shape that is substantially a parallelogram, and a plurality of slits extending in a column direction are formed on the pixel electrodes of the second display panel. Additionally, the pixel electrodes of the second display panel include a first side that extends in the column direction, a second side that extends in the column direction and opposes the first side, a third side that connects respective first ends of the first side and the second side, and a fourth side that connects respective second ends of the first side and the second side. The third side and the fourth side are each inclined at a predetermined angle with respect to a row direction. In Unexamined Japanese Patent Application Publication No. 2018-120045, by inclining the third side and the fourth side with respect to the row direction, an observer is prevented from visually recognizing a black matrix, wirings, and the like as periodic variations in brightness. That is, by inclining the third side and the fourth side with respect to the row direction, the occurrence of dark lines at the boundary between pixels adjacent in the column direction is suppressed.

When a plurality of liquid crystal display panels are stacked, the transmittance of the stacked display panels is the product of the transmittances of each of the stacked liquid crystal display panels and, as such, is lower than the transmittance of a single display panel. Accordingly, there is a desire for enhancing of the transmittance of each of the stacked liquid crystal display panels. The second display panel of Unexamined Japanese Patent Application Publication No. 2018-120045 operates in a transverse electric field mode, and among liquid crystal display panels that operate in transverse electric field modes, there are also liquid crystal display panels in which the pixel electrodes are formed from linear electrodes (branches) (for example, Unexamined Japanese Patent Application Publication (Translation of PCT Application) No. 2020-513111). When the pixel electrodes are formed from linear electrodes, even though the occurrence of dark lines is suppressed, disclination lines that occur between adjacent pixels may become dark areas, and the transmittance of the liquid crystal display panel may decline.

SUMMARY

A liquid crystal display panel according to a first aspect of the present disclosure includes:
  a plurality of pixels, each including a pixel electrode, a common electrode, and a liquid crystal that rotates in-plane due to voltage applied by the pixel electrode and the common electrode, wherein
  the pixel electrode includes a linear electrode, and
  when an initial alignment direction of the liquid crystal for which dielectric anisotropy is positive, or a direction perpendicular to the initial alignment direction of the liquid crystal for which dielectric anisotropy is negative is defined as a predetermined first direction,
  at a boundary between pixels, of the plurality of pixels, that are adjacent to each other, a boundary line between the adjacent pixels, the linear electrode, and an end side of the linear electrode are inclined with respect to the predetermined first direction, and inclining directions with respect to the predetermined first direction of the boundary line, the linear electrode, and the end side are identical.

A liquid crystal display device according to a second aspect of the present disclosure includes:
  the liquid crystal display panel that displays a monochrome image; and
  a color liquid crystal display panel that displays a color image.

It is to be understood that both the foregoing general description and the following detailed description are exemplary and explanatory and are not restrictive of this disclosure.

BRIEF DESCRIPTION OF THE DRAWINGS

A more complete understanding of this application can be obtained when the following detailed description is considered in conjunction with the following drawings, in which.

DETAILED DESCRIPTION

Hereinafter, a liquid crystal display panel and a liquid crystal display device according to various embodiments are described while referencing the drawings.

Embodiment 1

A liquid crystal display device 10 and a liquid crystal display panel 200 according to the present embodiment are described while referencing FIGS. 1 to 15. The liquid crystal display device 10 displays a color image using a color liquid crystal display panel 100 and a liquid crystal display panel 200, described later.

Figure 1:
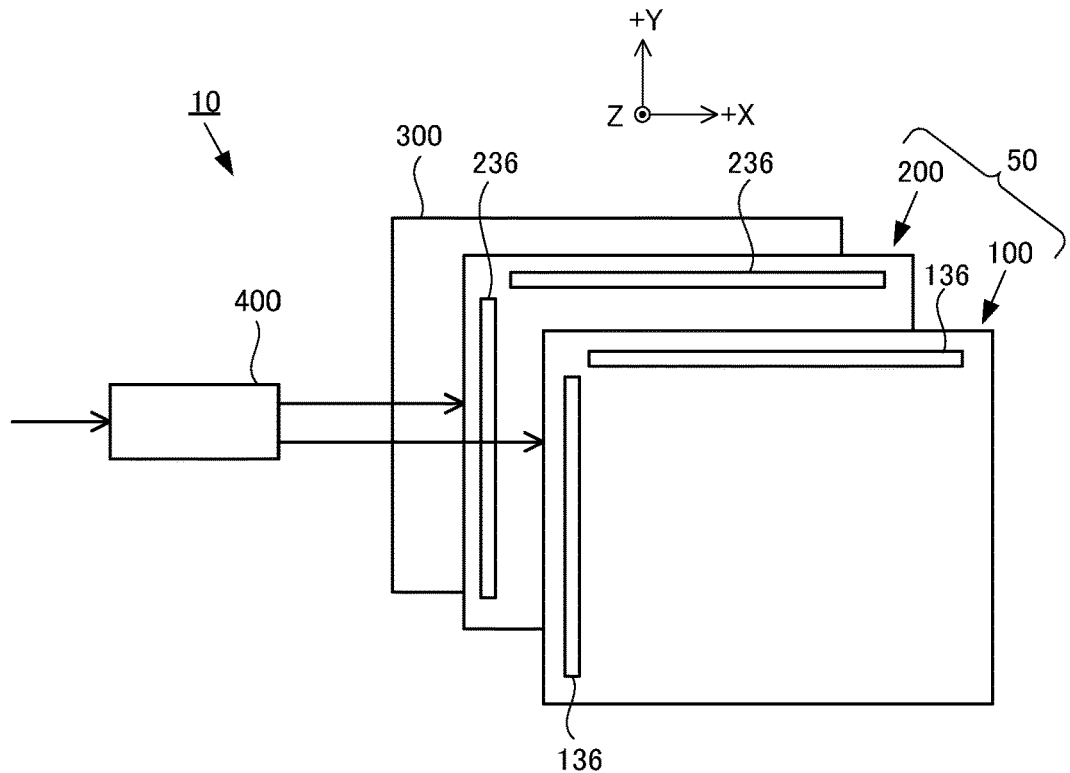
FIG. 1 is a schematic drawing illustrating a liquid crystal display device according to Embodiment 1.

As illustrated in FIG. 1, the liquid crystal display device 10 includes a panel section 50, a back light 300, and a display controller 400. The panel section 50 includes the color liquid crystal display panel 100 and the liquid crystal display panel 200. The back light 300 is a light source that emits light on the color liquid crystal display panel 100 and the liquid crystal display panel 200. The display controller 400 controls the displays of the color liquid crystal display panel 100 and the liquid crystal display panel 200. Note that, in the present description, to facilitate comprehension, in the liquid crystal display device 10 of FIG. 1, the right direction (the right direction on paper) is referred to as the "+X direction", the up direction (the up direction on paper) is referred to as the "+Y direction", and the direction perpendicular to the +X direction and the +Y direction (the front direction on paper) is referred to as the "+Z direction."

Panel Section

The panel section 50 includes the color liquid crystal display panel 100 and the liquid crystal display panel 200. The color liquid crystal display panel 100 is positioned on an observer side (the +Z side) and displays a color image. The liquid crystal display panel 200 is positioned on a side, opposite the surface of the observer side, of the color liquid crystal display panel 100 (a back surface side of the color liquid crystal display panel 100), and overlaps the color liquid crystal display panel 100. The liquid crystal display panel 200 displays a monochrome image.

Color Liquid Crystal Display Panel

In one example, the color liquid crystal display panel 100 is implemented as a known transmissive horizontal electric field type liquid crystal display panel. The color liquid crystal display panel 100 is active matrix driven by thin film transistors (TFT).

Figure 2:
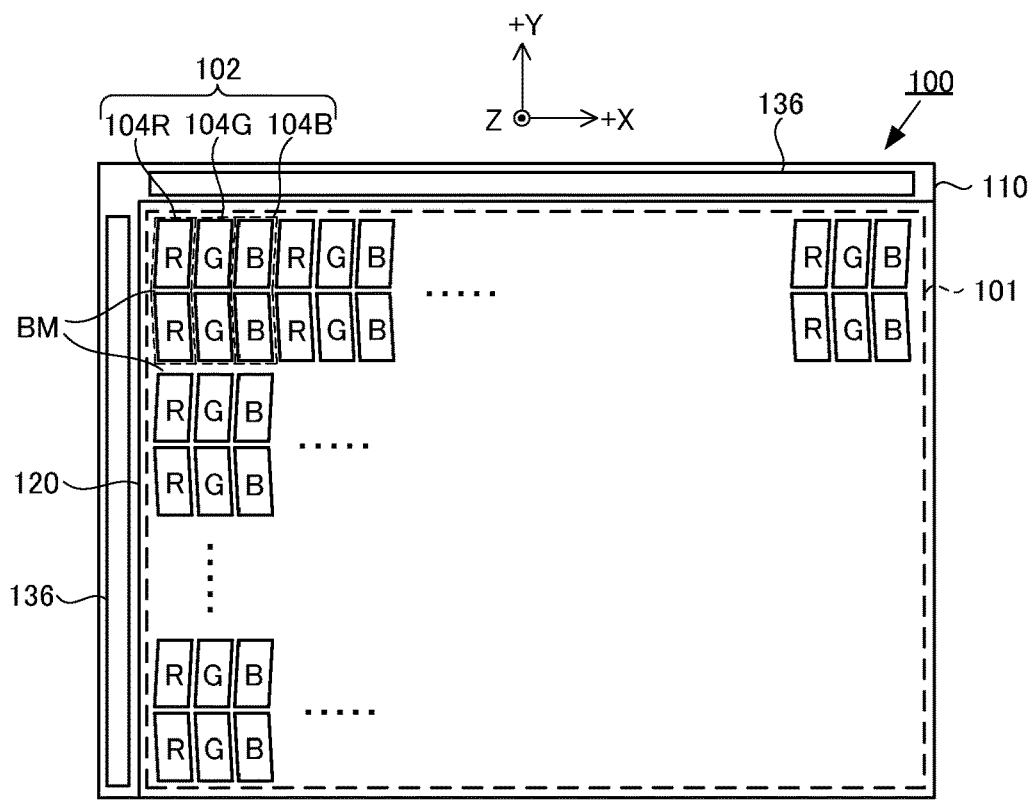
FIG. 2 is a plan view illustrating a color liquid crystal display panel according to Embodiment 1.

As illustrated in FIG. 2, the color liquid crystal display panel 100 includes, in a rectangular display region 101, main pixels 102 arranged in a matrix. The main pixels 102 include a red pixel 104R that emits red light, a green pixel 104G that emits green light, and a blue pixel 104B that emits blue light that are defined in a V-shape by a black matrix BM. Note that the red pixel 104R, the green pixel 104G, and the blue pixel 104B may be referred to collectively as "sub pixels 104."

Figure 3:
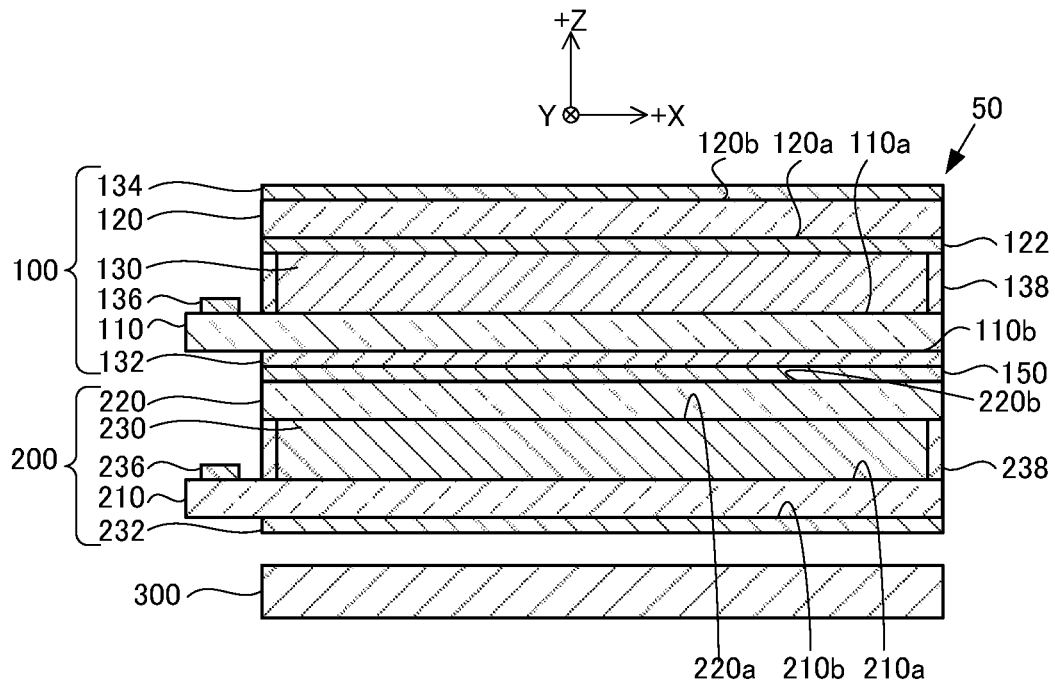
FIG. 3 is a cross-sectional view illustrating the liquid crystal display device according to Embodiment 1.

As illustrated in FIG. 3, the color liquid crystal display panel 100 includes a first TFT substrate 110, a first counter substrate 120, a first liquid crystal 130, a first polarizing plate 132, a second polarizing plate 134, and a first driver circuit 136. The first TFT substrate 110 and the first counter substrate 120 sandwich the first liquid crystal 130. The first polarizing plate 132 is provided on the first TFT substrate 110. The second polarizing plate 134 is provided on the first counter substrate 120.

In one example, the first TFT substrate 110 is implemented as a glass substrate. TFTs for selecting the sub pixels 104, common electrodes, pixel electrodes, an alignment film for aligning the first liquid crystal 130, and the like (all not illustrated in the drawings) are provided on a main surface 110a on the first liquid crystal 130 side of the first TFT substrate 110.

Furthermore, a plurality of common wirings, a plurality of signal wirings, and a plurality of scanning wirings (all not illustrated in the drawings) are formed on the main surface 110a of the first TFT substrate 110. The common wirings supply common potential to the common electrodes that apply voltage to the first liquid crystal 130. The signal wirings supply, via the TFTs, voltage to pixel electrodes that apply voltage to the first liquid crystal 130. The scanning wirings supply voltage for operating the TFTs. The sub pixels 104 are surrounded by the signal wirings and the scanning wirings, and the TFTs are provided at intersections of the scanning wirings and the signal wirings. The first polarizing plate 132 is provided on a main surface 110b on the side opposite the main surface 110a of the first TFT substrate 110.

As illustrated in FIG. 3, the first counter substrate 120 opposes the first TFT substrate 110 and is adhered to the first TFT substrate 110 by a seal material 138. In one example, the first counter substrate 120 is implemented as a glass substrate. A color filter layer 122, the black matrix BM, an alignment film for aligning the first liquid crystal 130, and the like are provided on a main surface 110a on the first liquid crystal 130 side of the first counter substrate 120. In one example, the color filter layer 122 is implemented as a stripe-like color filter. A red color filter, a green color filter, and a blue color filter of the color filter layer 122 are each surrounded by the black matrix BM, and respectively correspond to the red pixel 104R, the green pixel 104G, and the blue pixel 104B. The second polarizing plate 134 is provided on a main surface 120b on the side opposite the main surface 120a of the first counter substrate 120. Note that, to facilitate comprehension, the black matrix BM, the alignment film, and the like are omitted from FIG. 3.

The first liquid crystal 130 is sandwiched between the first TFT substrate 110 and the first counter substrate 120. In one example, the first liquid crystal 130 is implemented as a positive nematic liquid crystal. The first liquid crystal 130 is aligned, by the alignment film, in a direction parallel to the main surface 110a of the first TFT substrate 110. Additionally, the first liquid crystal 130 rotates in a plane parallel to the main surface 110a of the first TFT substrate 110 due to voltage being applied.

The first polarizing plate 132 is provided on the main surface 110b of the first TFT substrate 110. The second polarizing plate 134 is provided on the main surface 120b of the first counter substrate 120. One transmission axis of the polarizing plates, namely the transmission axis of the first polarizing plate 132 and the transmission axis of the second polarizing plate 134, is arranged parallel to an alignment direction of the first liquid crystal 130. The first polarizing plate 132 is adhered, by a light-transmitting adhesive layer 150, to a hereinafter described second counter substrate 220 of the liquid crystal display panel 200. In one example, the adhesive layer 150 is implemented as an optical clear adhesive (OCA).

The first driver circuit 136 is provided on the main surface 110a of the first TFT substrate 110. The first driver circuit 136 supplies, on the basis of a color image signal supplied from the display controller 400, voltage to the scanning wirings, the signal wirings, and the common wirings.

Liquid Crystal Display Panel

As illustrated in FIG. 3, the liquid crystal display panel 200 is positioned on a back surface side (−Z side) of the color liquid crystal display panel 100 and is adhered to the color liquid crystal display panel 100 by the adhesive layer 150. The liquid crystal display panel 200 displays a monochrome image.

Figure 4:
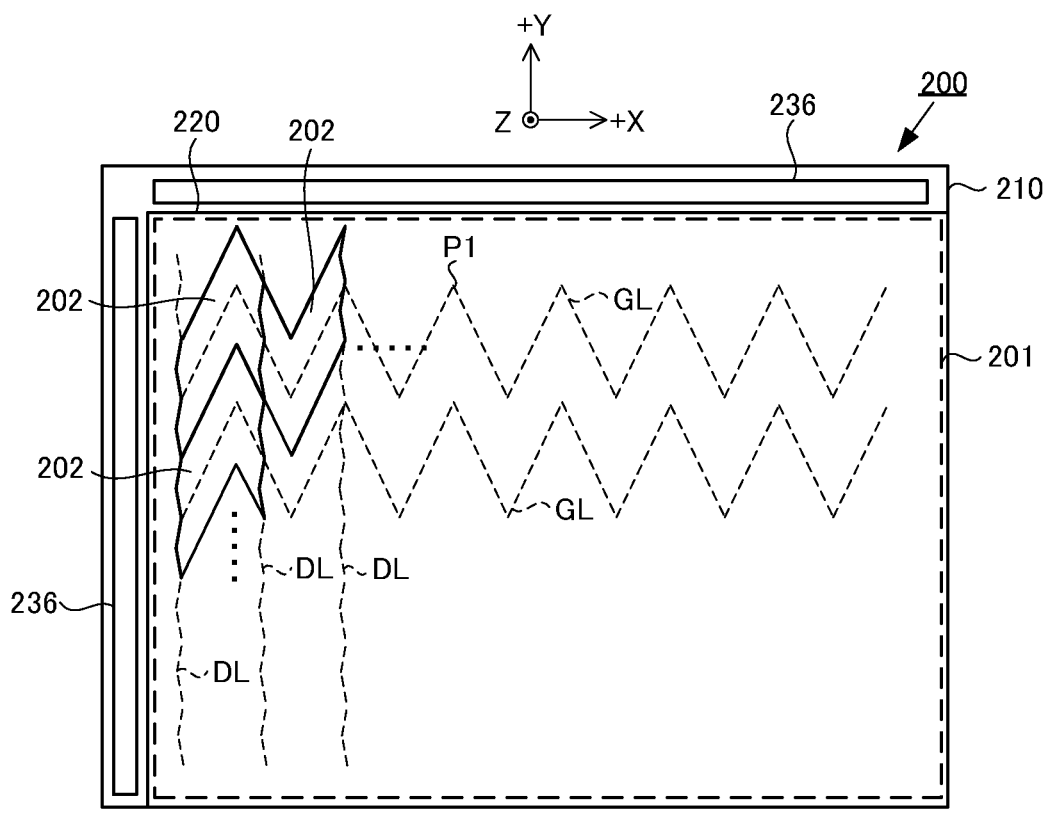
FIG. 4 is a plan view illustrating a liquid crystal display panel according to Embodiment 1.

In the present embodiment, the liquid crystal display panel 200 is implemented as a transmissive horizontal electric field type liquid crystal display panel that uses positive liquid crystal. The liquid crystal display panel 200 is active matrix driven by hereinafter described switching elements 240. As illustrated in FIG. 4, the liquid crystal display panel 200 includes, in a rectangular display region 201, main pixels 202 arranged in a matrix. The main pixels 202 of the liquid crystal display panel 200 emit light on the plurality of sub pixels 104 of the color liquid crystal display panel 100. The relationship between the of main pixels 202 of the liquid crystal display panel 200 and the main pixels 102 of the color liquid crystal display panel 100 is described later. Note that, in FIG. 4, the shape of the main pixels 202 of the liquid crystal display panel 200 is simplified.

As illustrated in FIG. 3, the liquid crystal display panel 200 includes a second TFT substrate 210, a second counter substrate 220, a second liquid crystal 230, a third polarizing plate 232, and a second driver circuit 236. The second TFT substrate 210 and the second counter substrate 220 sandwich the second liquid crystal 230. The third polarizing plate 232 is provided on the second TFT substrate 210. Note that, in the present embodiment, the first polarizing plate 132 of the color liquid crystal display panel 100 also serves as a polarizing plate on the light emission side of the liquid crystal display panel 200. Additionally, note that the liquid crystal display panel 200 is not provided with a color filter and a black matrix.

In one example, the second TFT substrate 210 is implemented as a glass substrate. A plurality of scanning wirings GL; a plurality of signal wirings DL; common wirings (not illustrated), switching elements 240, pixel electrodes 250, and common electrodes CE of the main pixels 202; an alignment film (not illustrated) for aligning the second liquid crystal 230; and the like (all described later) are formed on a main surface 210a, on the second liquid crystal 230 side, of the second TFT substrate 210. The common wirings supply common potential to the common electrodes CE that apply voltage to the second liquid crystal 230. The signal wirings DL supply voltage, via the switching elements 240, to pixel electrodes 250 that apply voltage to the second liquid crystal 230. The scanning wirings GL supply voltage for causing the switching elements 240 to operate. The third polarizing plate 232 is provided on a main surface 210b on the side opposite the main surface 210a of the second TFT substrate 210. Configurations of the scanning wirings GL, the pixel electrodes 250, and the like are described later.

The second counter substrate 220 opposes the second TFT substrate 210 and is adhered to the second TFT substrate 210 by a seal material 238. In one example, the second counter substrate 220 is implemented as a glass substrate. An alignment film (not illustrated) for aligning the second liquid crystal 230 is provided on a main surface 220a on the second liquid crystal 230 side of the second counter substrate 220. The adhesive layer 150 is provided on a main surface 220b on the side opposite the main surface 220a of the second counter substrate 220. The second counter substrate 220 is adhered to the color liquid crystal display panel 100 (the first polarizing plate 132) via the adhesive layer 150.

The second liquid crystal 230 is sandwiched between the second TFT substrate 210 and the second counter substrate 220. The second liquid crystal 230 is implemented as a positive (dielectric anisotropy is positive) nematic liquid crystal. The second liquid crystal 230 is initially aligned in the +Y direction by the alignment film. In the present embodiment, the +Y direction that is the initial alignment direction of the positive second liquid crystal 230 corresponds to a predetermined first direction.

The second liquid crystal 230 rotates in-plane parallel to the main surface 210a of the second TFT substrate 210 due to voltage being applied. The rotation of the second liquid crystal 230 is described later.

The third polarizing plate 232 is provided on the main surface 210b of the second TFT substrate 210. A transmission axis of the third polarizing plate 232 is arranged parallel to the initial alignment direction of the second liquid crystal 230. Note that the transmission axis of the third polarizing plate 232 and the transmission axis of the first polarizing plate 132 (polarizing plate on the light emission side of the liquid crystal display panel 200) of the color liquid crystal display panel 100 are orthogonal to each other, and the liquid crystal display panel 200 operates in a normally black mode.

The second driver circuit 236 is provided on the main surface 210a of the second TFT substrate 210. The second driver circuit 236 supplies, on the basis of a signal supplied from the display controller 400, voltage to the scanning wirings GL, the signal wirings DL, and the common wirings.

Figure 5:
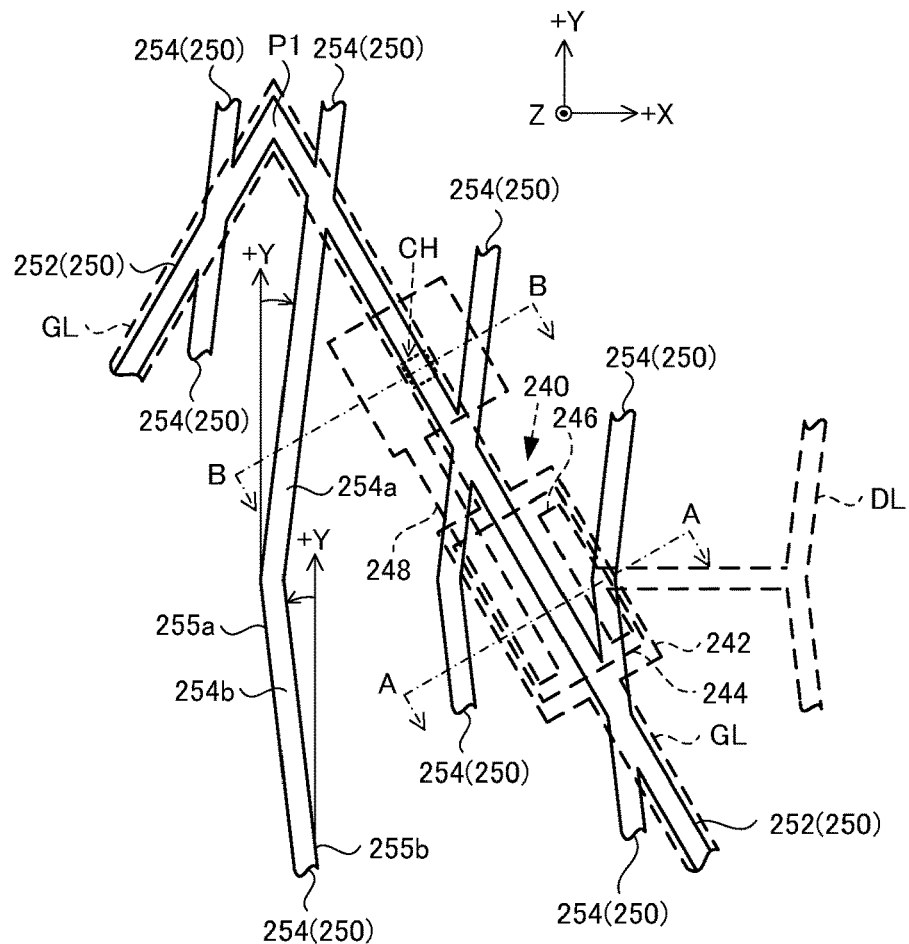
FIG. 5 is a plan view illustrating a scanning wiring, pixel electrodes, and the like of the liquid crystal display panel according to Embodiment 1.
Figure 6:
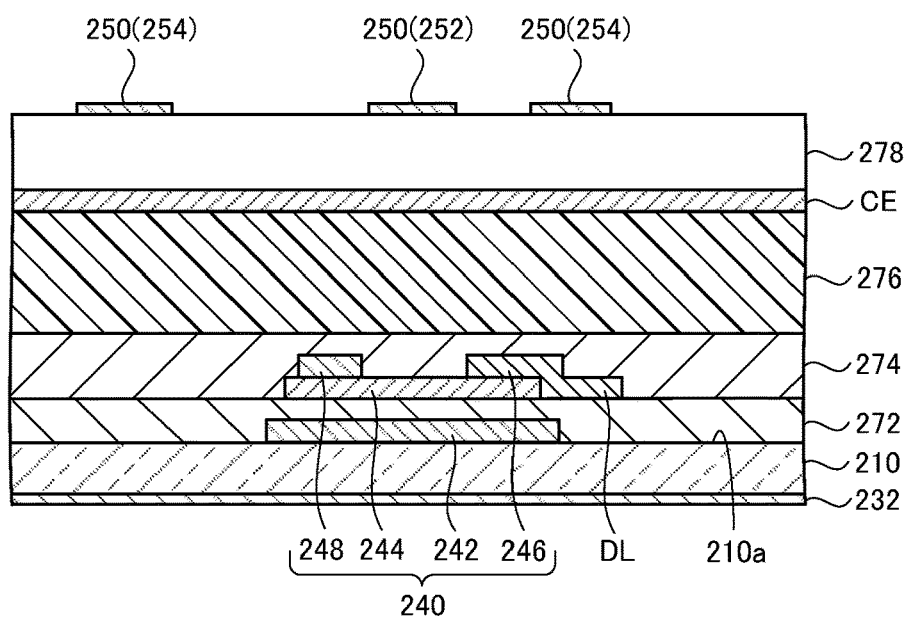
FIG. 6 is a cross-sectional view of a switching element illustrated in FIG. 5, taken along line A-A.
Figure 7:
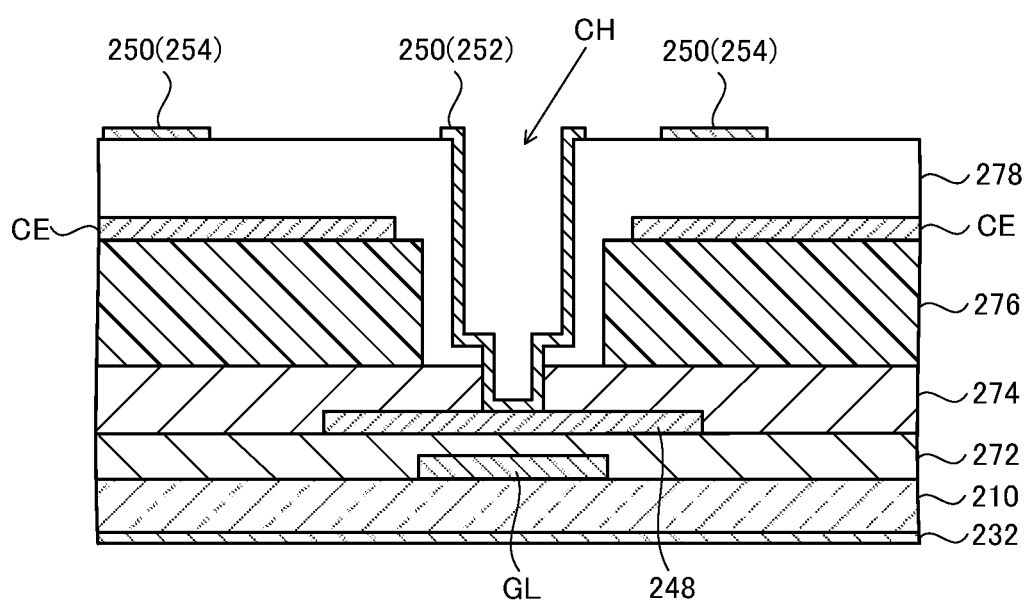
FIG. 7 is a cross-sectional view of a contact hole illustrated in FIG. 5, taken along line B-B.

Next, the configurations of the scanning wirings GL, the signal wirings DL, the main pixels 202, and the like are described while referencing FIGS. 4 to 11. FIG. 5 is a plan view illustrating one of the scanning wirings GL, the signal wirings DL, the pixel electrodes 250, and the like. FIG. 6 is a cross-sectional view of one of the switching elements 240 illustrated in FIG. 5, taken along line A-A, and FIG. 7 is a cross-sectional view of a contact hole CH illustrated in FIG.

Figure 8:
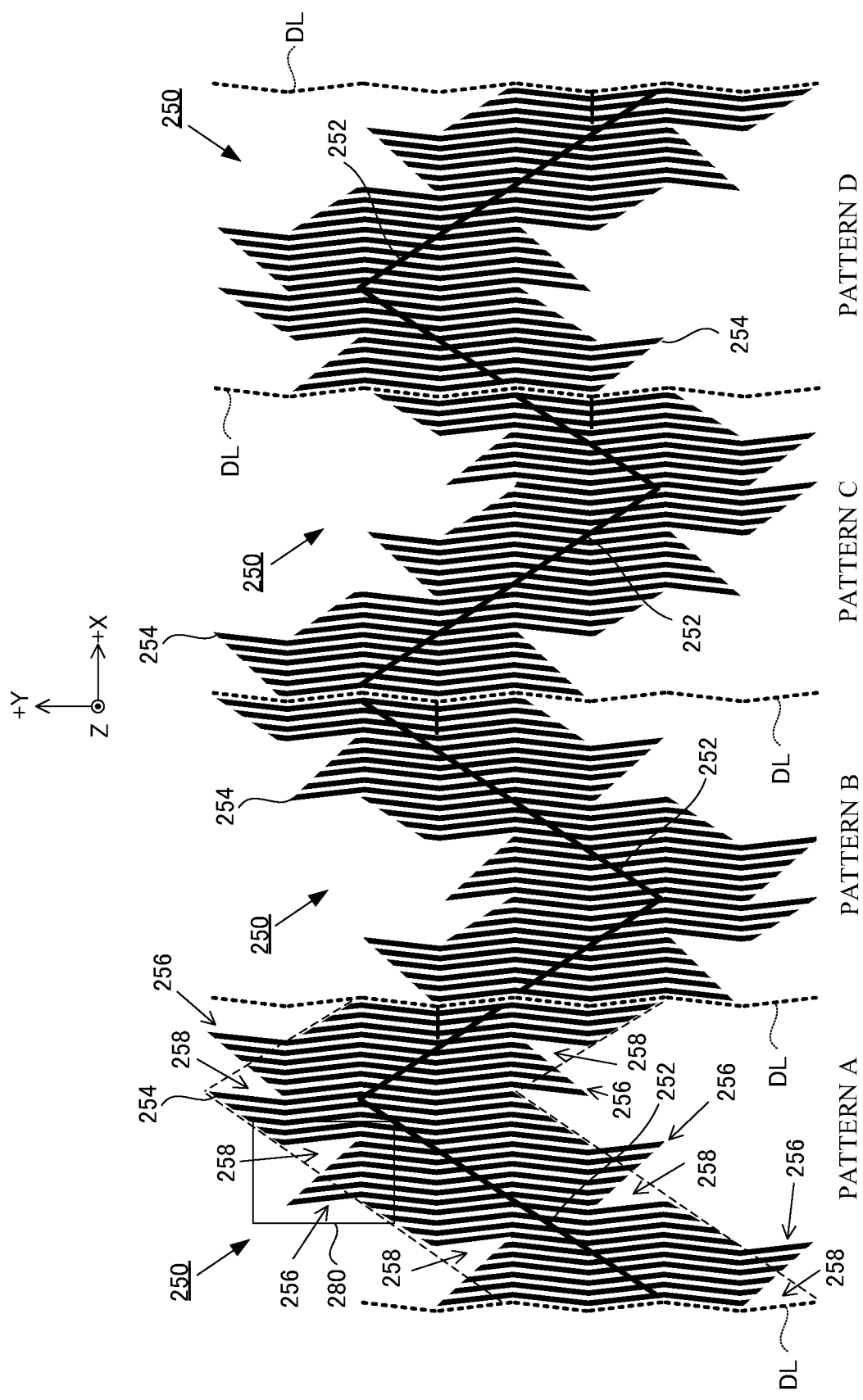
FIG. 8 is a plan view illustrating the pixel electrodes of the liquid crystal display panel according to Embodiment 1.

5, taken along line B-B. FIG. 8 is a plan view illustrating the pixel electrodes 250. Note that, to facilitate comprehension, a portion of the linear electrodes 254 of the pixel electrodes 250 (described later) and the common electrodes CE are omitted from FIG. 5. Additionally, hatching of the third insulating layer 278 is omitted from FIGS. 6 and 7. In FIG. 8, the pixel electrodes 250 are illustrated by solid lines.

As illustrated in FIGS. 4 and 5, the scanning wirings GL extend in the X direction in a zig-zag manner. As described later, a bending point P1 of each of the scanning wirings GL overlaps the black matrix BM that extends in the X direction of the color liquid crystal display panel 100. As illustrated in FIG. 7, each of the scanning wirings GL is formed on the main surface 210a of the second TFT substrate 210 and is covered by a first insulating layer 272. The scanning wirings GL are formed from a metal such as aluminum (Al), molybdenum (Mo), or the like. In the present embodiment, the X direction in which the scanning wirings GL extend corresponds to a predetermined second direction.

As illustrated in FIGS. 4 and 5, the signal wirings DL extend in the Y direction and bend along the linear electrodes 254 of the pixel electrodes 250. As illustrated in FIG. 6, each of the signal wirings DL is formed on the first insulating layer 272, and is covered by a second insulating layer 274. The signal wirings DL are also formed from a metal such as aluminum (Al), molybdenum (Mo), or the like.

As illustrated in FIGS. 6 and 7, each of the common electrodes CE is formed on an organic interlayer film 276 that is formed on the second insulating layer 274. In one example, the common electrodes CE are formed from indium tin oxide (ITO). The common electrodes CE are covered by a third insulating layer 278.

The switching elements 240 are provided near intersections of the scanning wirings GL and the signal wirings DL. As illustrated in FIGS. 5 and 6, each of the switching elements 240 includes a gate electrode 242, a semiconductor layer 244, a source electrode 246, and a drain electrode 248. In one example, the switching elements 240 are implemented as TFT elements.

The gate electrode 242 is formed, integrally with the scanning wiring GL, on the main surface 210a of the second TFT substrate 210. As with the scanning wiring GL, the gate electrode 242 is covered by the first insulating layer 272. The semiconductor layer 244 is provided, via the first insulating layer 272, in an island manner on the gate electrode 242. In one example, the semiconductor layer 244 is formed from amorphous silicon. The source electrode 246 branches from the signal wiring DL and is formed on the semiconductor layer 244. The drain electrode 248 extends along the scanning wiring GL from on the semiconductor layer 244. As illustrated in FIG. 7, the drain electrode 248 is connected to a hereinafter described base line electrode 252 of each of the pixel electrodes 250 via the contact hole CH that penetrates the third insulating layer 278, the organic interlayer film 276, and the second insulating layer 274. As with the signal wirings DL, the source electrode 246 and the drain electrode 248 are formed from a metal such as aluminum (Al), molybdenum (Mo), or the like. Additionally, as illustrated in FIG. 6, the semiconductor layer 244, the source electrode 246, and the drain electrode 248 on the semiconductor layer 244 are covered by the second insulating layer 274.

As illustrated in FIGS. 6 and 7, the first insulating layer 272 covers the scanning wiring GL, and the gate electrode 242 of the switching element 240. The second insulating layer 274 covers the semiconductor layer 244, the source electrode 246, and the drain electrode 248 on the semiconductor layer 244 of the switching element 240, and the first insulating layer 272. The organic interlayer film 276 is formed on the second insulating layer 274 from a photosensitive resin. The third insulating layer 278 covers the common electrode CE and the organic interlayer film 276. The first insulating layer 272, the second insulating layer 274, and the third insulating layer 278 are formed from silicon nitride (SiNx), silicon oxide (SiOx), or the like.

As illustrated in FIGS. 6 and 7, the pixel electrodes 250 are formed on the third insulating layer 278. In one example, the pixel electrodes 250 are formed from ITO. As illustrated in FIGS. 5 and 8, each of the pixel electrodes 250 includes the base line electrode 252 and the linear electrodes 254.

The base line electrode 252 is provided on the scanning wiring GL, and bends along the scanning wiring GL. Accordingly, the base line electrode 252 includes a bending point P1 that is the same as the bending point P1 of the scanning wiring GL.

The linear electrodes 254 branch from the base line electrode 252 and extend in the +Y direction or the −Y direction. Each of the linear electrodes 254 includes a first incline 254a and a second incline 254b. In the first incline 254a, long sides 255a, 255b of the linear electrode 254 are inclined in a clockwise direction at an acute angle with respect to the +Y direction, and the first incline 254a is inclined in the clockwise direction at an acute angle with respect to the +Y direction. In the second incline 254b, the long sides 255a, 255b of the linear electrode 254 are inclined in a counterclockwise direction at an acute angle with respect to the +Y direction, and the second incline 254b is inclined in the counterclockwise direction at an acute angle with respect to the +Y direction. Each of the linear electrodes 254 extend in the +Y direction or the −Y direction by repeating the first incline 254a and the second incline 254b. The linear electrodes 254 are disposed in the X direction, parallel to each other, at equal spacings.

As illustrated in FIG. 8, the outer shape of each of the pixel electrodes 250 bends along the scanning wiring GL, and has an asymmetrical V shape including a protrusion 256 and a notch 258 on the +Y side and the −Y side. As described later, the protrusion 256 and the notch 258 are provided in order to make, at a boundary 290 between main pixels 202 adjacent in the Y direction, the inclining direction relative to the Y direction of a boundary line 292 between the adjacent main pixels 202 and an inclining direction relative to the Y direction of the linear electrode 254 the same. Here, in the present specification, the inclining directions being the same means being inclined in the same direction (clockwise or counterclockwise) at an acute angle with respect to the predetermined first direction. For example, when the boundary line 292 and the linear electrode 254 are both inclined clockwise at acute angles with respect to the +Y direction, the inclining directions of the boundary line 292 and the linear electrode 254 are the same. Additionally, in the present embodiment, the outer shape of the pixel electrodes 250 is used as the shape of the main pixels 202.

Patterns of the outer shapes of the pixel electrodes 250 (patterns of the linear electrodes 254) are divided into pattern A to pattern D illustrated in FIG. 8, and one set of the pattern A to the pattern D is repeatedly arranged in the X direction. Meanwhile, the pixel electrodes 250 having the same pattern are arranged in the Y direction. Note that the pattern A and the pattern C, and the pattern B and the pattern D have rotational symmetry about the X axis.

In the present embodiment, at the boundary 290 between the main pixels 202 adjacent in the Y direction, the inclining direction of the boundary line 292 between the adjacent main pixels 202 relative to the +Y direction (that is, the initial alignment direction of the positive second liquid crystal 230) and the inclining direction of the linear electrodes 254 relative to the +Y direction are the same. Next, the inclining direction of the boundary line 292 and the inclining direction of the linear electrodes 254 are described while referencing FIG. 9, using a portion 280 illustrated in FIG. 8 as an example.

Figure 9:
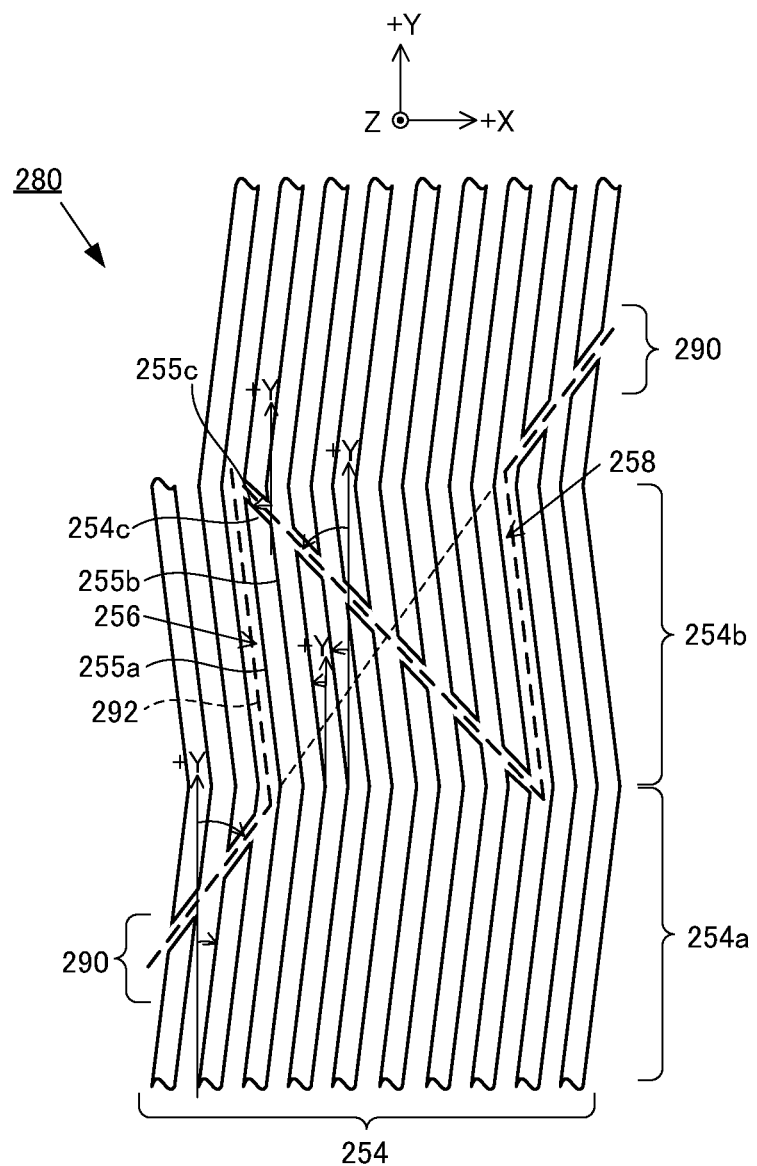
FIG. 9 is a plan view illustrating a boundary between adjacent pixels of the liquid crystal display panel according to Embodiment 1.

As illustrated in FIG. 9, in a case in which the linear electrodes 254 at the boundary 290 are the first incline 254a that is inclined in the clockwise direction at an acute angle with respect to the +Y direction, the boundary line 292 is inclined in the clockwise direction at an acute angle with respect to the +Y direction in the same manner as the first incline 254a. Additionally, in a case in which the linear electrodes 254 at the boundary 290 are the second incline 254b that is inclined in the counterclockwise direction at an acute angle with respect to the +Y direction, the boundary line 292 is inclined in the counterclockwise direction at an acute angle with respect to the +Y direction in the same manner as the second incline 254b due to the protrusion 256 and the notch 258 being provided. As with the portion 280, the inclining direction of the boundary line 292 relative to the +Y direction and the inclining direction of the linear electrodes 254 relative to the +Y direction are the same at other portions of the pixel electrode 250 as well. Note that, the linear electrodes 254 are disposed parallel to each other in the X direction and, as such, at the boundary 290 between the main pixels 202 adjacent in the X direction, the inclining direction of the boundary line 292 between the main pixels 202 adjacent in the X direction and the inclining direction of the linear electrode 254 are the same.

Figure 10:
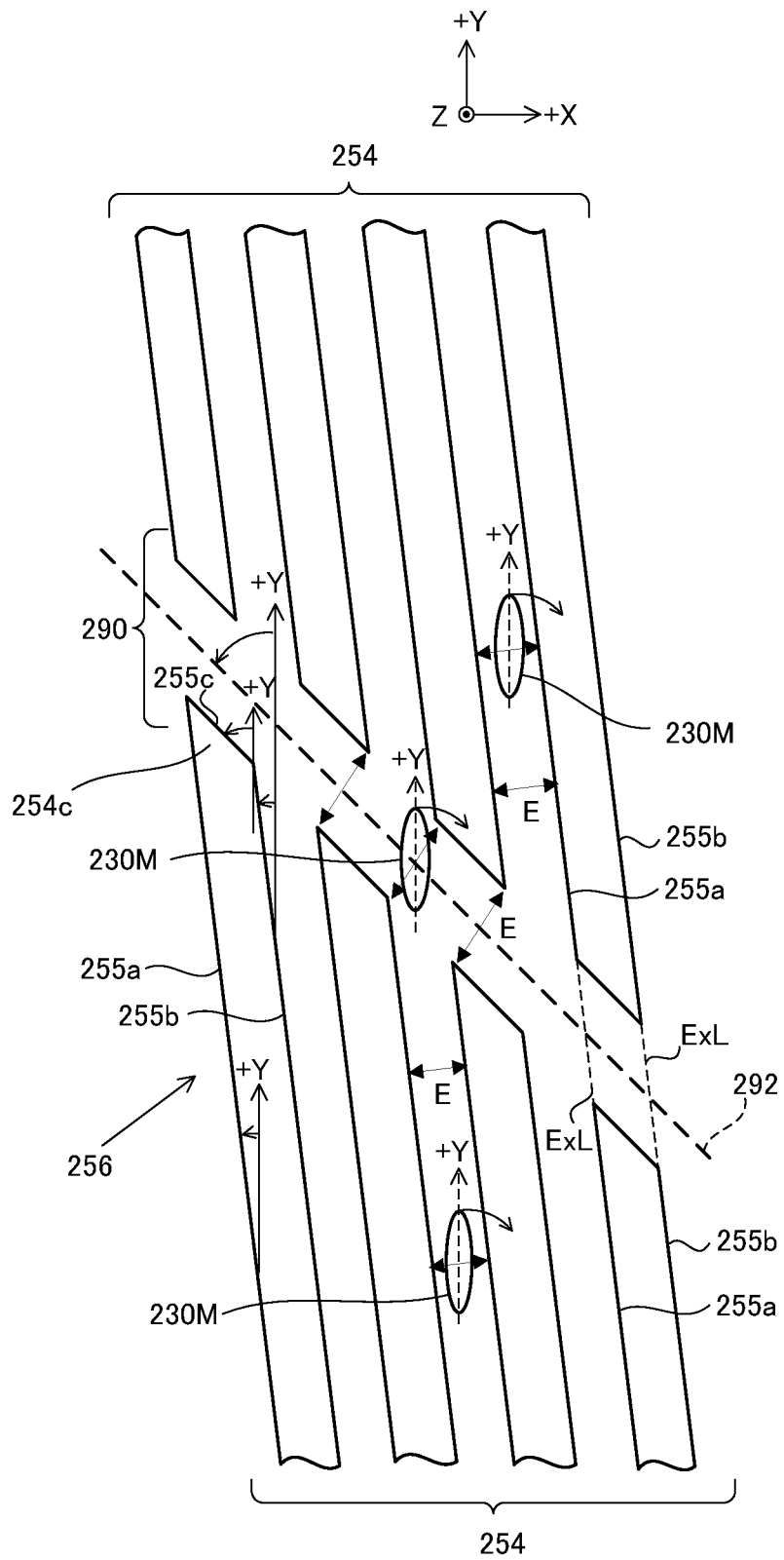
FIG. 10 is a schematic drawing illustrating a rotation of liquid crystal molecules according to Embodiment 1.

In the present embodiment, the inclining direction of the boundary line 292 and the inclining direction of the linear electrodes 254 are the same. Additionally, as illustrated in FIG. 9, a tip 254c of each of the linear electrodes 254 has a shape such as a so-called chisel edge. A bevel of the edge of the tip 254c of each of the linear electrodes 254, that is, an end edge 255c of each of the linear electrodes 254 is inclined in the clockwise or counter clockwise direction at an acute angle with respect to the +Y direction, and the inclining directions relative to the +Y direction of the end edge 255c of each of the linear electrodes 254 and the boundary line 292 are the same. Due to this, as illustrated in FIG. 10, an electric field (field direction E) is generated at the boundary 290. This electric field causes liquid crystal molecules 230M at the boundary 290 between the adjacent main pixels 202 to rotate in the same direction (for example, in the clockwise direction with respect to the +Y direction) as the liquid crystal molecules 230M within the main pixels 202. Accordingly, the occurrence of disclination lines can be suppressed by causing the liquid crystal molecules 230M within the main pixels 202 and the liquid crystal molecule 230M at the interface that an end region of the boundary 290 contacts to rotate in the same direction and, also, the occurrence of dark lines can be suppressed by causing the liquid crystal molecules 230M in a bulk region of the boundary 290 to rotate in the same direction. The occurrence of disclination lines and dark lines can be suppressed and, as such, the transmittance of the liquid crystal display panel 200 is improved.

Figure 11:
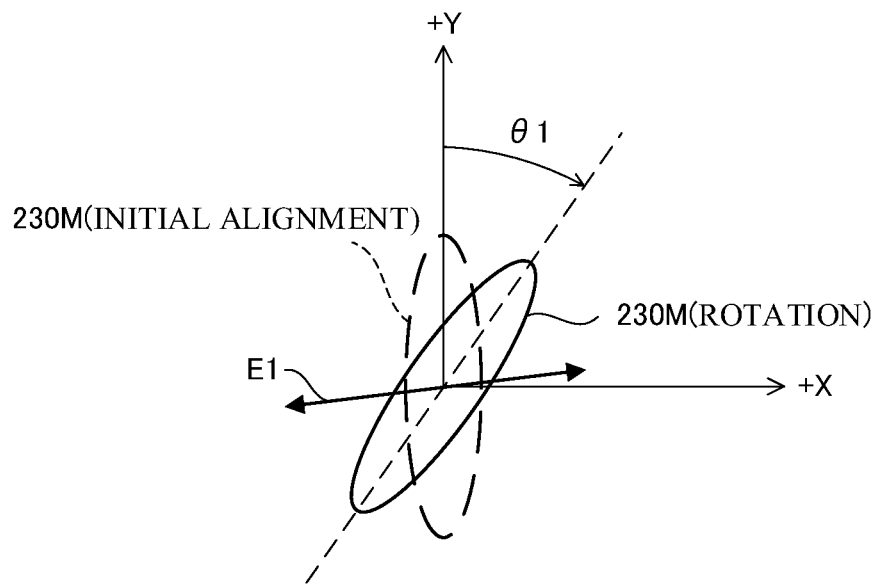
FIG. 11 is a schematic drawing illustrating the rotation of liquid crystal molecules within a main pixel according to Embodiment 1.
Figure 12:
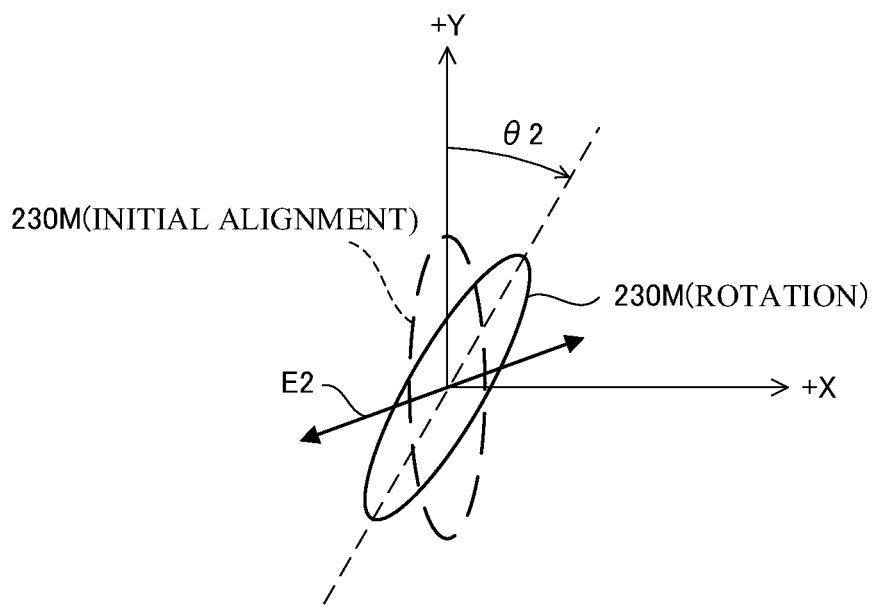
FIG. 12 is a schematic drawing illustrating the rotation of liquid crystal molecules at the boundary according to Embodiment 1.

The rotation of the liquid crystal molecules 230M and the transmittance of the liquid crystal display panel 200 are described in greater detail while referencing FIGS. 11 and 12. FIG. 11 illustrates an initial alignment state of the liquid crystal molecules 230M and a state in which the liquid crystal molecules 230M are rotated by the electric field generated by the linear electrodes 254, within the main pixels 202. The field direction E1 illustrated in FIG. 11 indicates the direction of the electric field generated by the linear electrodes 254 within the main pixel 202. The angle θ1 illustrated in FIG. 11 indicates the angle at which the liquid crystal molecules 230M within the main pixel 202 rotate due to the electric field. FIG. 12 illustrates the initial alignment state of the liquid crystal molecules 230M, and a state in which the liquid crystal molecules 230M are rotated by the electric field generated by the linear electrodes 254, at the boundary 290. The field direction E2 illustrated in FIG. 12 indicates the direction of the electric field generated at the boundary 290. The angle θ2 indicates the angle at which the liquid crystal molecules 230M at the boundary 290 rotate due to the electric field.

Typically, when liquid crystal molecules are uniformly aligned between two vertical polarizing plates that have polarization axes orthogonal to each other, the intensity of the light that transmits through the vertical polarizing plates is expressed by equation (1) below.

$$I = I_0 \times \sin^2(2 \times \theta) \times \sin^2(\pi \Delta n d / \lambda) \qquad (1)$$

Here, I represents the intensity of emitted light, $I_0$ represents the intensity of entering light, θ represents the angle formed between the polarization axis of the polarizing plates and the long axis direction of the liquid crystal, Δn represents the refraction index anisotropy of the liquid crystal molecules, d represents the thickness of the gap in which the liquid crystal is sealed, and λ represents the wavelength of the light. According to equation (1), the intensity of the emitted light is greatest when θ=45°. As such, the field direction E1 formed by the linear electrodes 254 and the alignment direction of the second liquid crystal 230 within the main pixel 202 are set such that the intensity of the emitted light (that is, the transmittance of the liquid crystal display panel 200) is greatest when the liquid crystal molecules 230M are rotated on the basis of equation (1).

In the present embodiment, the inclining direction of the boundary line 292 and the inclining direction of the linear electrodes 254 are the same and, also, the inclining direction of the boundary line 292 and the inclining direction of the end edge 255c of each of the linear electrodes 254 are the same. As such, as illustrated in FIGS. 11 and 12, the direction of the electric field at the boundary 290 (the field direction E2) approaches the direction of the electric field within the main pixel 202 (the field direction E1). Due to this, the liquid crystal molecules 230M at the boundary 290 rotate continuously with the liquid crystal molecules 230M within the main pixel 202 and, as such, the transmittance of light that transmits through the boundary 290 approaches the transmittance of light that transmits through the main pixel 202. Accordingly, decreases of the transmittance of the light that transmits through the boundary 290 can be suppressed, and the transmittance of the liquid crystal display panel 200 can be improved.

Figure 13:
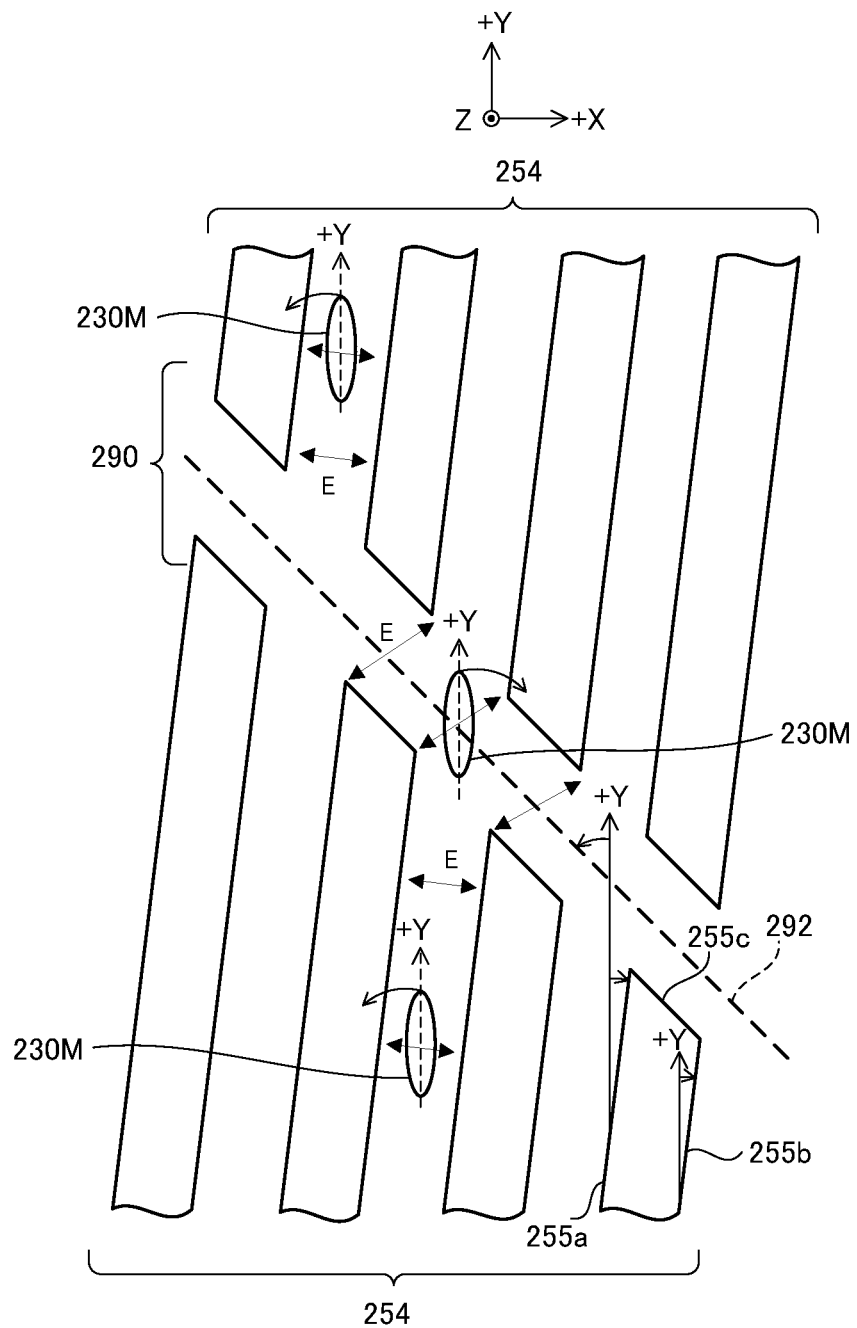
FIG. 13 is a schematic drawing illustrating the rotation of liquid crystal according to Comparative Example 1.

Meanwhile, when, for example, the inclining direction of the boundary line 292 and the inclining direction of the linear electrodes 254 differ (hereinafter referred to as Comparative Example 1), the liquid crystal molecules 230M at the boundary 290 between the adjacent main pixels 202 and the liquid crystal molecules 230M within the main pixels 202 may rotate in different directions. In Comparative Example 1, for example, as illustrated in FIG. 13, the liquid crystal molecules 230M at the boundary 290 between the adjacent main pixels 202 rotate clockwise with respect to the +Y direction, and the liquid crystal molecules 230M within the main pixels 202 rotate counterclockwise with respect to the +Y direction. As a result, disclination lines are generated and the transmittance of the liquid crystal display panel having the configuration of Comparative Example 1 declines at the interface where the adjacent main pixels 202 and the end region of the boundary 290 of Comparative Example 1 contact.

As described above, the inclining direction of the boundary line 292, the inclining direction of the linear electrodes 254, and the inclining direction of the end edge 255c of each of the linear electrodes 254 are the same. As such, it is possible to control the rotation of the liquid crystal molecules 230M between the adjacent main pixels 202 to suppress occurrences of disclination lines and dark lines, and improve the transmittance of the liquid crystal display panel 200.

Next, the relationship between the main pixels 202 of the liquid crystal display panel 200 and the main pixels 102 of the color liquid crystal display panel 100 is described. In the present embodiment, the main pixels 202 of the liquid crystal display panel 200 have a shape that is bent along the scanning wiring GL. Furthermore, the main pixels 202 of the liquid crystal display panel 200 emit light on a plurality of the sub pixels 104 of the color liquid crystal display panel 100. Accordingly, it is preferable that the display region 201 of the liquid crystal display panel 200 is wider than the display region 101 of the color liquid crystal display panel 100.

Figure 14:
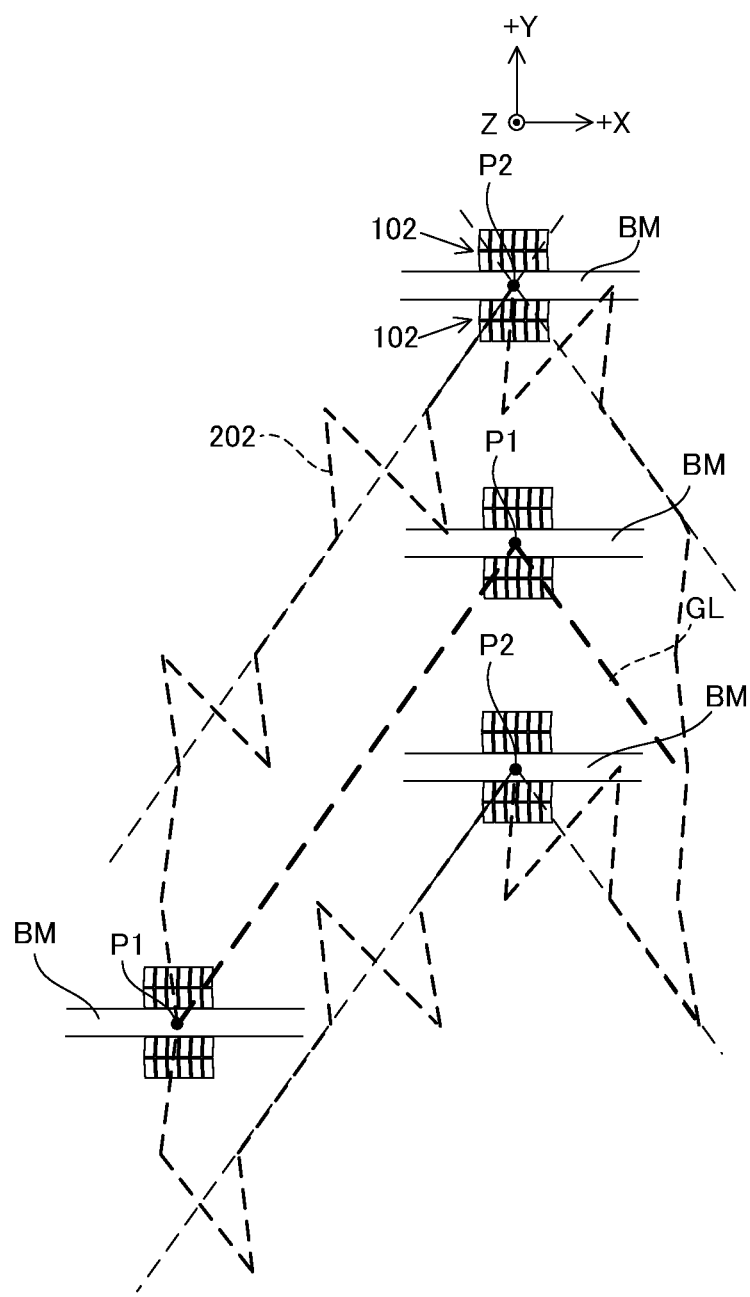
FIG. 14 is a plan view illustrating the relationship between main pixels of the liquid crystal display panel and main pixels of the color liquid crystal display panel, according to Embodiment 1.

Additionally, as illustrated in FIG. 14, the bending point (that is, the bending point of the base line electrode 252) P1 of each of the scanning wirings GL of the liquid crystal display panel 200 overlaps the black matrix BM, of the color liquid crystal display panel 100, that defines the main pixels 102 of the color liquid crystal display panel 100 and extends in the X direction. Moreover, a V-shape bending point P2 of each of the main pixels 202 of the liquid crystal display panel 200 also overlaps the black matrix BM, of the color liquid crystal display panel 100, that defines the main pixels 102 of the color liquid crystal display panel 100 and extends in the X direction. As a result, the color liquid crystal display panel 100 can use the light emitted from the liquid crystal display panel 200 with high efficiency. Note that, to facilitate comprehension, the black matrix BM of the color liquid crystal display panel 100 is illustrated in an exaggerated manner in FIG. 14.

Back Light

As illustrated in FIG. 1, the back light 300 is arranged on the back surface side (the −Z side) of the liquid crystal display panel 200. In one example, the back light 300 is implemented as a direct back light. The back light 300 includes a white light emitting diode (LED), a reflective sheet, a diffusion sheet, and the like (all not illustrated in the drawings).

Display Controller

Figure 15:
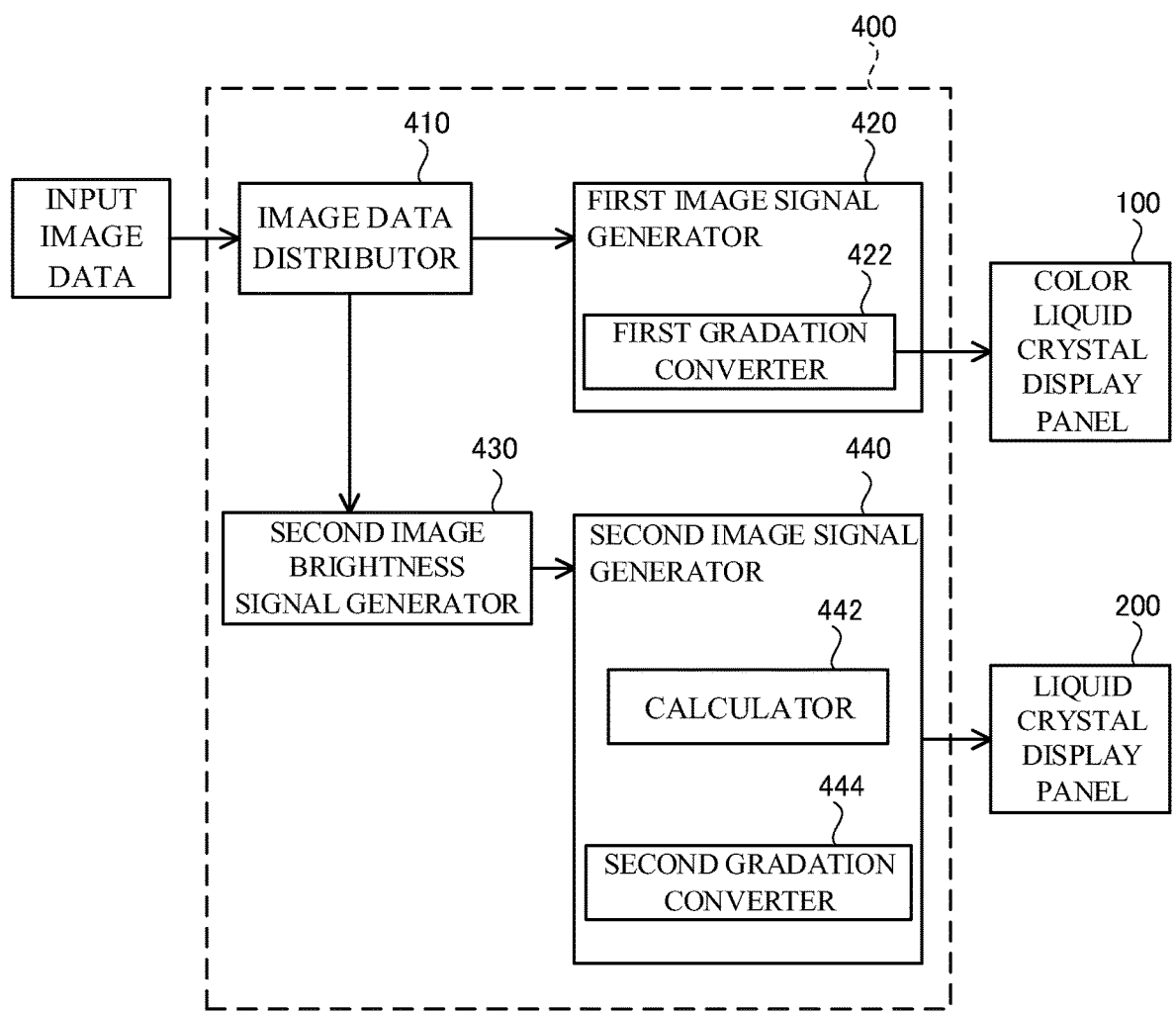
FIG. 15 is a block diagram illustrating a display controller according to Embodiment 1.

The display controller 400 controls the displays of the color liquid crystal display panel 100 and the liquid crystal display panel 200. As illustrated in FIG. 15, the display controller 400 includes an image data distributor 410, a first image signal generator 420, a second image brightness signal generator 430, and a second image signal generator 440.

The image data distributor 410 distributes input image data to the first image signal generator 420 and the second image brightness signal generator 430.

The first image signal generator 420 generates, from the input image data distributed by image data distributor 410, the color image to be displayed on the color liquid crystal display panel 100. Specifically, a first gradation converter 422 of the first image signal generator 420 performs gradation conversion for converting the distributed input image data to color image data having brightness-gradation characteristics suited to the color liquid crystal display panel 100. In one example, a lookup table in which input/output relationships are preset is used in the conversion of the data. The first image signal generator 420 sends a color image signal expressing the generated color image to the first driver circuit 136 of the color liquid crystal display panel 100.

The second image brightness signal generator 430 generates, from the input image data distributed from the image data distributor 410, a brightness signal for generating the monochrome image to be displayed on the liquid crystal display panel 200. In one example, the second image brightness signal generator 430 calculates a brightness level of one main pixel 202 of the liquid crystal display panel 200 from an average value, a frequency value, a minimum value, a maximum value, and the like of the plurality of sub pixels 104 of the color liquid crystal display panel 100 into which the light emitted from one main pixel 202 of the liquid crystal display panel 200 enters. The calculated brightness level may be a gradation value. The second image brightness signal generator 430 sends a brightness signal expressing the calculated brightness level to the second image signal generator 440.

The second image signal generator 440 generates, on the basis of the brightness signal sent from the second image brightness signal generator 430, the monochrome image to be displayed on the liquid crystal display panel 200. In one example, the second image signal generator 440 generates a monochrome image that has been subjected to averaging processing and gradation conversion. Specifically, in one example, the calculator 442 of the second image signal generator 440 uses a weighted average based on the distance from a target main pixel 202 to average the brightness levels of the main pixels 202 located within a predetermined distance from the target main pixel 202. As a result, the second image signal generator 440 can generate a monochrome image that has blurred edges. Furthermore, a second gradation converter 444 of the second image signal generator 440 generates monochrome image data having brightness-gradation characteristics suited to the liquid crystal display panel 200. The configuration of the second gradation converter 444 is the same as that of the first gradation converter 422 of the first image signal generator 420.

The monochrome image signal sent to the liquid crystal display panel 200 is delayed, by the calculation of the brightness level, the averaging processing, and the like executed by the second image brightness signal generator 430, with respect to the color image signal sent to the color liquid crystal display panel 100. As such, the display controller 400 includes a non-illustrated synchronization circuit for synchronizing the outputting of the monochrome image signal and the color image signal. Due to this synchronization circuit, the monochrome image corresponding to the color image of the color liquid crystal display panel 100 is displayed on the liquid crystal display panel 200 and, as such, an appropriate color image is displayed on the liquid crystal display device 10.

The display controller 400 is configured from a central processing unit (CPU), a memory, and the like. In one example, the CPU executes programs stored in the memory to realize the functions of the display controller 400.

As described above, in the liquid crystal display panel 200, the inclining direction of the boundary line 292, the inclining direction of the linear electrodes 254, and the inclining direction of the end edge 255c of each of the linear electrodes 254 are the same. As such, it is possible to control the rotation of the liquid crystal molecules 230M between the adjacent main pixels 202 to suppress the occurrence of disclination lines, and also suppress the occurrence of dark lines. The occurrences of disclination lines and dark lines can be suppressed and, as such, the transmittance of the liquid crystal display panel 200 can be improved. Additionally, since the transmittance of the liquid crystal display panel 200 is improved, the transmittance of the liquid crystal display device 10 is also improved.

Embodiment 2

In Embodiment 1, the second liquid crystal 230 of the liquid crystal display panel 200 is implemented as a positive nematic liquid crystal. However, a configuration is possible in which the second liquid crystal 230 of the liquid crystal display panel 200 is a negative (dielectric anisotropy is negative) nematic liquid crystal. Here, the initial alignment direction of the second liquid crystal 230 and the rotation of the second liquid crystal 230 at the boundary 290 are described. The other configurations of the present embodiment are the same as described in Embodiment 1.

The second liquid crystal 230 that is a negative nematic liquid crystal is initially aligned in the +X direction. In the present embodiment, the +Y direction, that is perpendicular to the +X direction which is the initial alignment direction of the negative second liquid crystal 230, corresponds to the predetermined first direction.

Figure 16:
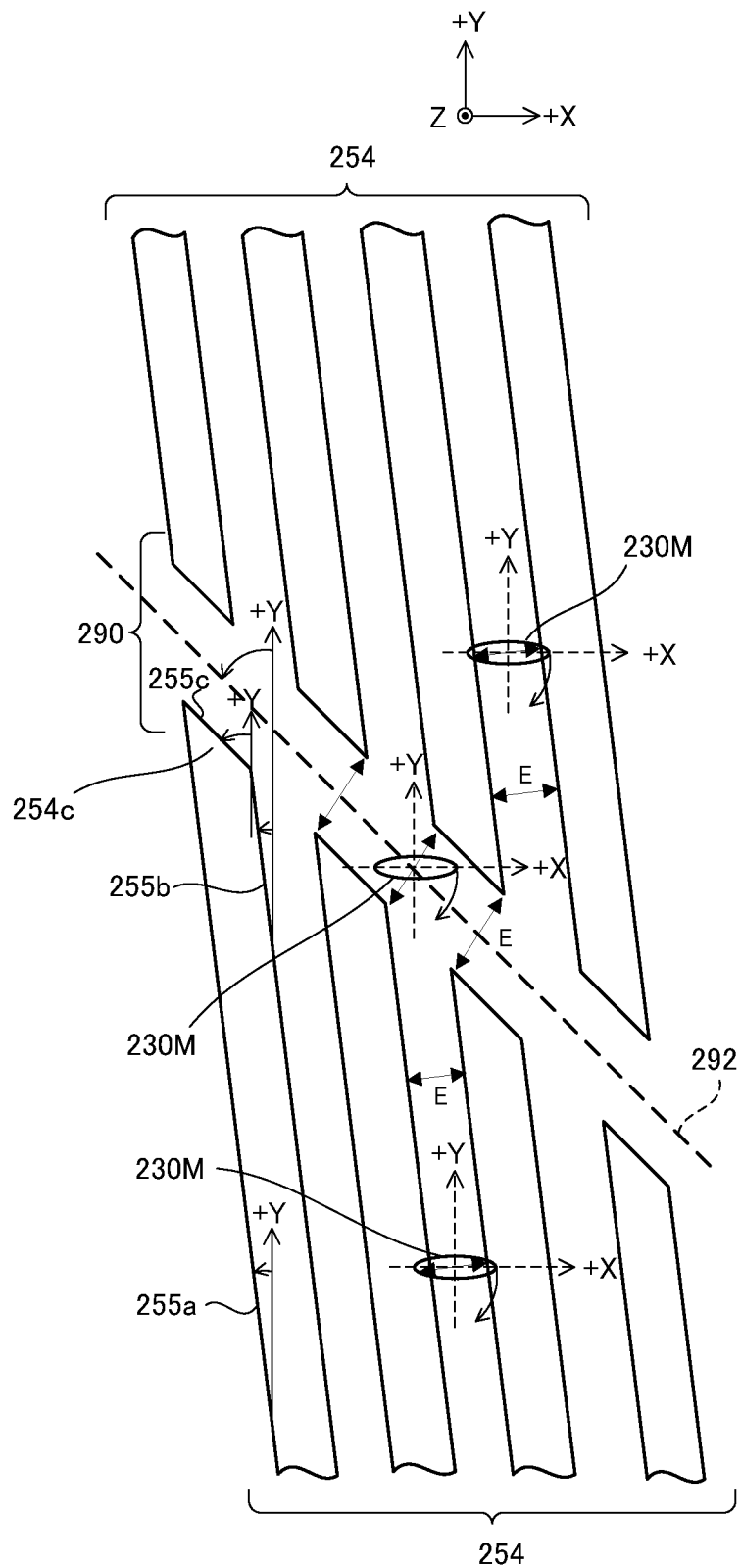
FIG. 16 is a schematic drawing illustrating the rotation of liquid crystal according to Embodiment 2.

As in Embodiment 1, in the present embodiment as well, at the boundary 290 between the main pixels 202 adjacent in the Y direction, the inclining direction of the boundary line 292 between the adjacent main pixels 202 relative to the +Y direction (that is, the direction perpendicular to the initial alignment direction of the negative second liquid crystal 230) and the inclining direction of the linear electrodes 254 relative to the +Y direction are the same. Additionally, the inclining direction relative to the +Y direction of the end edge 255c of each of the linear electrodes 254 and the inclining direction relative to the +Y direction of the boundary line 292 are the same. Due to this, as illustrated in FIG. 16, an electric field (field direction E) is generated at the boundary 290. This electric field causes liquid crystal molecules 230M at the boundary 290 between the adjacent main pixels 202 to rotate in the same direction (for example, in the clockwise direction with respect to the +Y direction) as the liquid crystal molecules 230M within the main pixels 202. Accordingly, as in Embodiment 1, it is possible to control the rotation of the liquid crystal molecules 230M between the adjacent main pixels 202 to suppress the occurrence of disclination lines and, also, suppress the occurrence of dark lines, and the transmittance of the liquid crystal display panel 200 can be improved.

Figure 17:
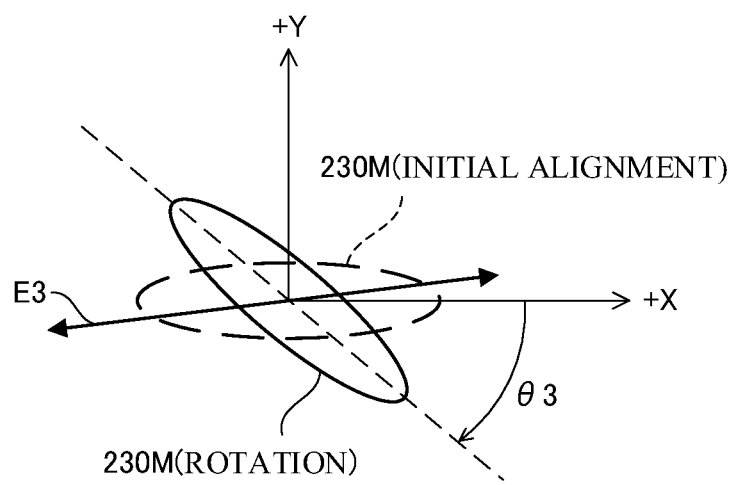
FIG. 17 is a schematic drawing illustrating the rotation of liquid crystal molecules within a main pixel according to Embodiment 2.
Figure 18:
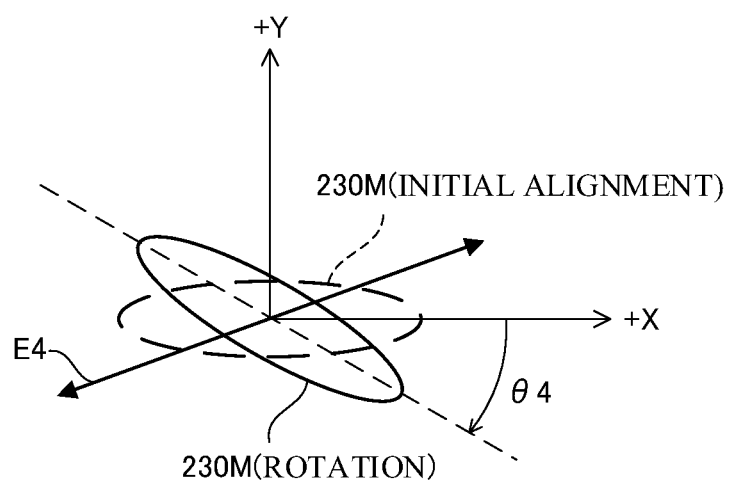
FIG. 18 is a schematic drawing illustrating the rotation of liquid crystal molecules at a boundary according to Embodiment 2.

FIG. 17 illustrates the initial alignment state of the liquid crystal molecules 230M and a state in which the liquid crystal molecules 230M are rotated by the electric field generated by the linear electrodes 254, within the main pixels 202. The field direction E3 illustrated in FIG. 17 indicates the direction of the electric field generated by the linear electrodes 254 within the main pixel 202. The angle θ3 indicates the angle at which the liquid crystal molecules 230M within the main pixels 202 rotate due to the electric field. FIG. 18 illustrates the initial alignment state of the liquid crystal molecules 230M, and a state in which the liquid crystal molecules 230M are rotated by the electric field generated by the linear electrodes 254, at the boundary 290. The field direction E4 illustrated in FIG. 18 indicates the direction of the electric field generated at the boundary 290. The angle θ4 indicates the angle at which the liquid crystal molecules 230M at the boundary 290 rotate due to the electric field.

In the present embodiment as well, the inclining direction of the boundary line 292 and the inclining direction of the linear electrodes 254 are the same and, also, the inclining direction of the boundary line 292 and the inclining direction of the end edge 255c of each of the linear electrodes 254 are the same. As such, as illustrated in FIGS. 17 and 18, the direction of the electric field (the field direction E4) at the boundary 290 approaches the direction of the electric field within the main pixels 202 (the field direction E3), and the liquid crystal molecules 230M at the boundary 290 rotate continuously with the liquid crystal molecules 230M within the main pixels 202. Accordingly, in the present embodiment as well, as in Embodiment 1, decreases of the transmittance of the light that transmits through the boundary 290 can be suppressed and the transmittance of the liquid crystal display panel 200 can be improved.

Figure 19:
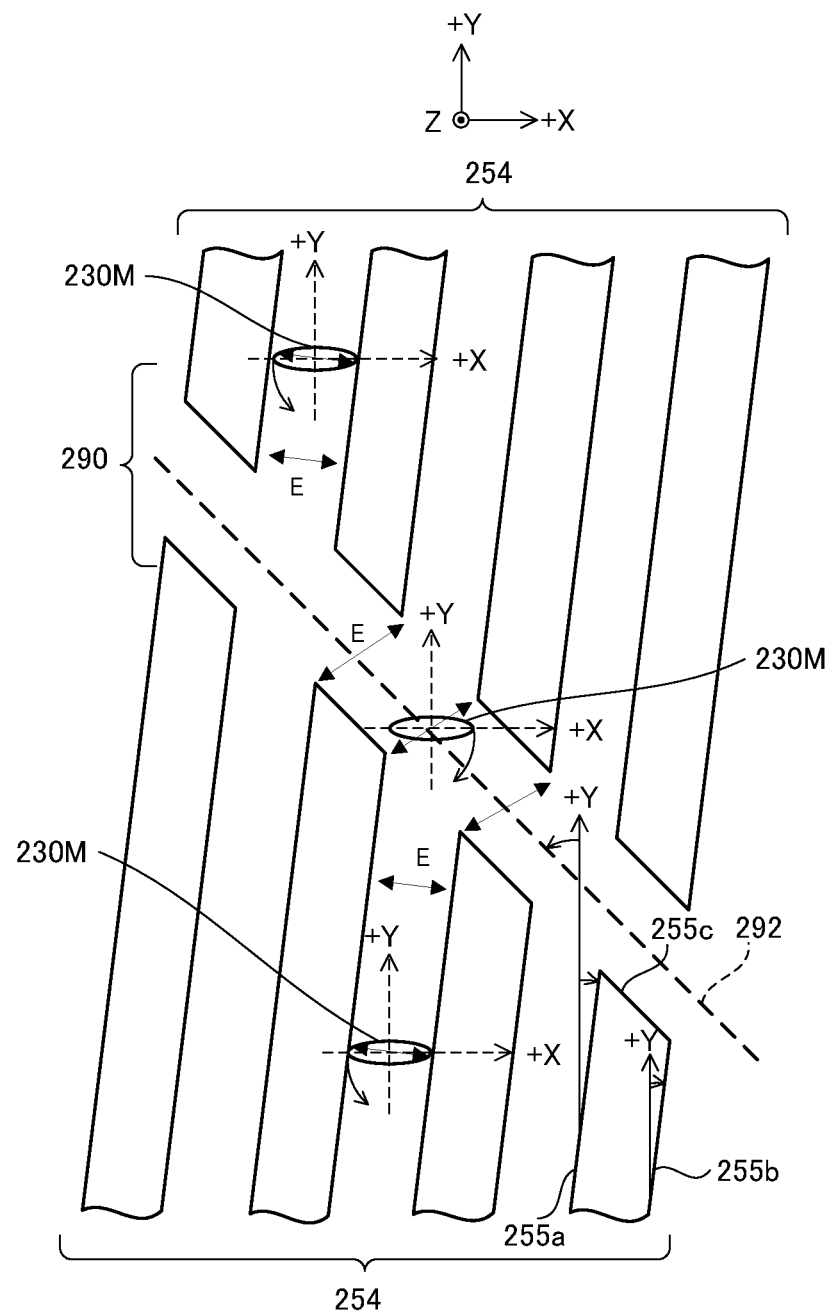
FIG. 19 is a schematic drawing illustrating the rotation of liquid crystal according to Comparative Example 2.

Meanwhile, when the inclining direction of the boundary line 292 and the inclining direction of the linear electrodes 254 differ (hereinafter referred to as Comparative Example 2), the liquid crystal molecules 230M at the boundary 290 between the adjacent main pixels 202 and the liquid crystal molecules 230M within the main pixels 202 may rotate in different directions. In Comparative Example 2, for example, as illustrated in FIG. 19, the liquid crystal molecules 230M at the boundary 290 between the adjacent main pixels 202 rotate clockwise with respect to the +Y direction, and the liquid crystal molecules 230M within the main pixels 202 rotate counterclockwise with respect to the +Y direction. As a result, disclination lines are generated and the transmittance of the liquid crystal display panel having the configuration of Comparative Example 2 declines at the interface where the adjacent main pixels 202 and the end region of the boundary 290 of Comparative Example 2 contact.

As described above, even when the negative second liquid crystal 230 is used, it is possible to control the rotation of the liquid crystal molecules 230M between the adjacent main pixels 202 to suppress the occurrence of disclination lines and, also, suppress the occurrence of dark lines, and the transmittance of the liquid crystal display panel 200 can be improved.

Modified Examples

Embodiments have been described, but various modifications can be made to the present disclosure without departing from the spirit and scope of the present disclosure.

For example, in the embodiments, the color liquid crystal display panel 100 is a horizontal electric field type liquid crystal display panel that uses a positive liquid crystal, but a configuration is possible in which the mode of the color liquid crystal display panel 100 is a vertical alignment (VA) mode, a twisted nematic (TN) mode, or the like. Additionally, the display region 101 of the color liquid crystal display panel 100 and the display region 201 of the liquid crystal display panel 200 are not limited to rectangular shapes and may have non-rectangular shapes.

A configuration is possible in which the liquid crystal display panel 200 includes a polarization plate on the main surface 220b (polarization plate on the light emission side) of the second counter substrate 220, and independently displays a monochrome image. Furthermore, a configuration is possible in which the liquid crystal display panel 200 includes a color filter and a black matrix on the main surface 220a of the second counter substrate 220, and displays a color image.

In Embodiment 1, the initial alignment direction of the second liquid crystal 230 (the positive liquid crystal) is the +Y direction, but a configuration is possible in which the initial alignment direction of the second liquid crystal 230 (the positive liquid crystal) is the −Y direction. In Embodiment 2, the initial alignment direction of the second liquid crystal 230 (the negative liquid crystal) is the +X direction, but a configuration is possible in which the initial alignment direction of the second liquid crystal 230 (the negative liquid crystal) is the −X direction.

In the embodiments, the linear electrodes 254 of the liquid crystal display panel 200 are formed from the first incline 254a that is inclined in the clockwise direction at an acute angle with respect to the +Y direction, and the second incline 254b that is inclined in the counterclockwise direction at an acute angle with respect to the +Y direction. However, it is sufficient that the linear electrodes 254 be inclined with respect to the predetermined first direction (the +Y direction). For example, the linear electrodes 254 may be formed only from the first incline 254a.

The patterns of the outer shape of the main pixels 202 of the liquid crystal display panel 200 (the pattern of the linear electrodes 254) are not limited to the pattern A to the pattern D. Provided that the inclining direction of the boundary line 292 between the adjacent main pixels 202 relative to the +Y direction (the predetermined first direction) and the inclining direction of the linear electrodes 254 relative to the +Y direction are the same, the patterns of the outer shape of the main pixels 202 (the patterns of the linear electrodes 254) may be set as desired.

Figure 20:
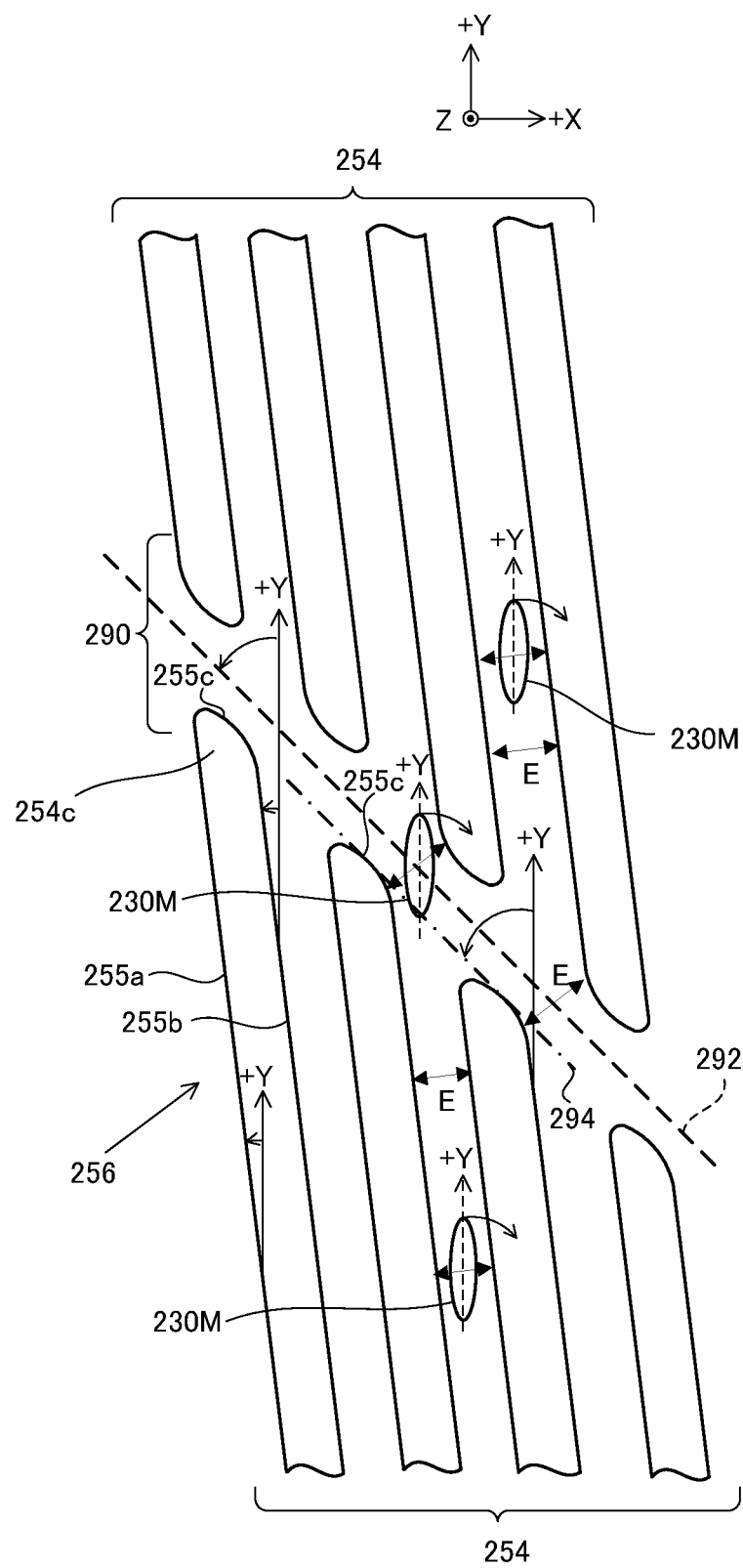
FIG. 20 is a schematic drawing illustrating an end side of a linear electrode according to a modified example.

In Embodiment 1, the end edge 255c of each of the linear electrodes 254 has a straight line shape. However, it is sufficient that, at the boundary 290, the end edge 255c of each of the linear electrodes 254 is inclined in the same direction as the boundary line 292 and the linear electrodes 254 and, as illustrated in FIG. 20, a configuration is possible in which the end edge 255c has a curved shape. When the end edge 255c of each of the linear electrodes 254 has a curved shape, for example, the inclining direction relative to the +Y direction of a tangent 294 of the end edge 255c and the inclining directions relative to the +Y direction of the boundary line 292 and the linear electrodes 254 are the same. Additionally, a configuration is possible in which the tip 254c of each of the linear electrodes 254 is rounded.

In Embodiment 2 as well, it is sufficient that the end edge 255c of each of the linear electrodes 254 is inclined in the same direction as the boundary line 292 and the linear electrodes 254, and a configuration is possible in which the end edge 255c has a curved shape. Additionally, a configuration is possible in which the tip 254c of each of the linear electrodes 254 is rounded.

Figure 21:
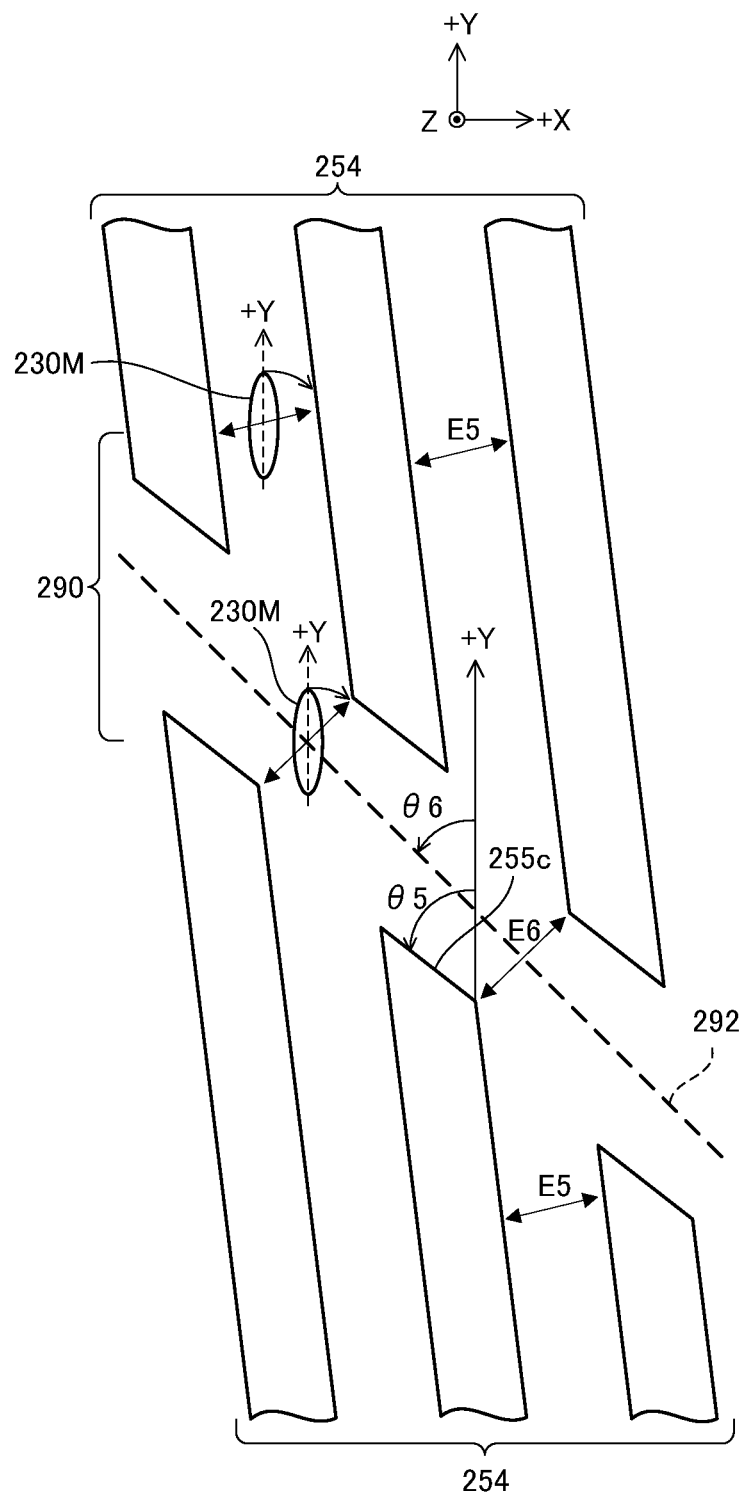
FIG. 21 is a schematic drawing illustrating an end side of a linear electrode and a boundary line according to a modified example.

As illustrated in FIG. 21 it is preferable that an inclination angle θ5 relative to the predetermined first direction of the end edge 255c of each of the linear electrodes 254 is greater than an inclination angle θ6 relative to the predetermined first direction of the boundary line 292. Due to this, the direction of the electric field (field direction E6) at the boundary 290 approaches the direction of the electric field (field direction E5) within the main pixels 202 and, as a result, the transmittance of the liquid crystal display panel 200 can be improved. Note that FIG. 21 illustrates the second liquid crystal 230 as a positive liquid crystal, but the same is true for a case in which the second liquid crystal 230 is a negative liquid crystal.

Figure 22:
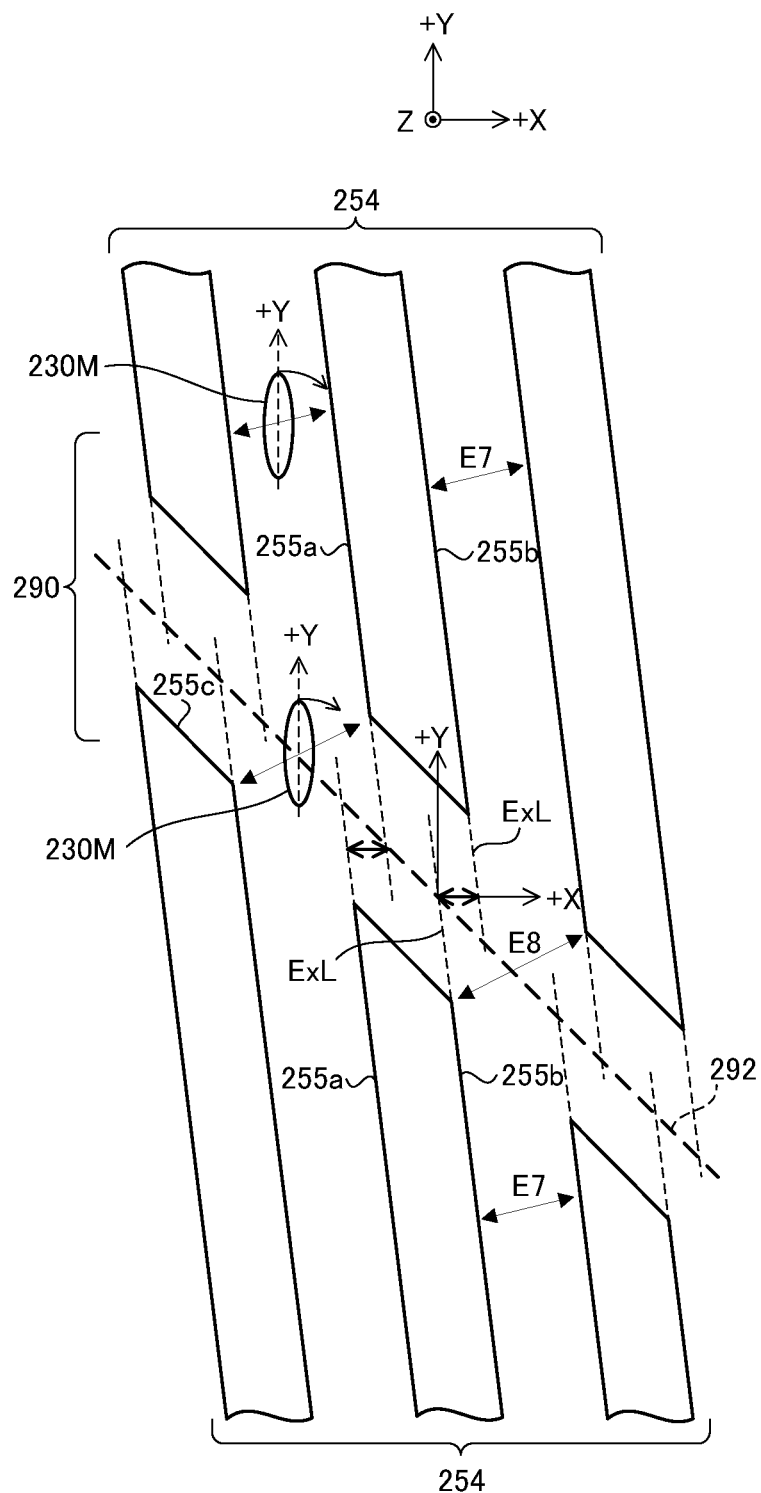
FIG. 22 is a schematic drawing illustrating a linear electrode according to a modified example.

In the embodiments, as illustrated in FIG. 10, at the boundary 290, an extension line ExL of the long side 255a of the linear electrode 254 in one of the main pixels 202 and an extension line ExL of the long side 255a of the linear electrode 254 in the other of the main pixels 202 match. Additionally, an extension line ExL of the long side 255b of the linear electrode 254 in one of the main pixels 202 and an extension line ExL of the long side 255b of the linear electrode 254 in the other of the main pixels 202 match. However, a configuration is possible in which, at the boundary 290, as illustrated in FIG. 22, the extension line ExL of the long side 255a of the linear electrode 254 in one of the main pixels 202 and the extension line ExL of the long side 255a of the linear electrode 254 in another of the main pixels 202 are offset in the direction (X direction) perpendicular to the predetermined first direction (the +Y direction). A configuration is possible in which, at the boundary 290, the extension line ExL of the long side 255b of the linear electrode 254 in one of the main pixels 202 and the extension line ExL of the long side 255b of the linear electrode 254 in another of the main pixels 202 are offset in the direction perpendicular to the predetermined first direction. Due to this, the direction of the electric field (field direction E8) at the boundary 290 approaches the direction of the electric field (field direction E7) within the main pixels 202 and, as a result, the transmittance of the liquid crystal display panel 200 can be improved. Note that FIG. 22 illustrates the second liquid crystal 230 as a positive liquid crystal, but the same is true for a case in which the second liquid crystal 230 is a negative liquid crystal.

Figure 23:
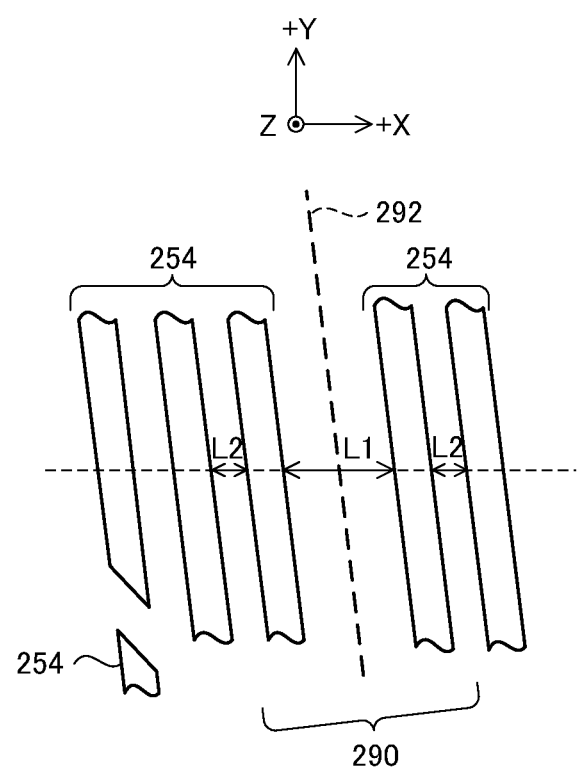
FIG. 23 is a plan view illustrating a linear electrode according to a modified example.

In the embodiments, the linear electrodes 254 of the liquid crystal display panel 200 are disposed at an equal spacing in the X direction. At the boundary 290 between the adjacent main pixels 202, when the linear electrodes 254 of one of the main pixels 202 and the linear electrodes 254 of the other of the main pixels 202 are parallel, as illustrated in FIG. 23, it is preferable that a spacing L1 between the linear electrodes 254 of one of the main pixels 202 and the linear electrodes 254 of the other of the main pixels 202 is wider than a spacing L2 between the linear electrodes 254 within each of the main pixels 202. Due to this, when the liquid crystal display panel 200 is driven by inversion driving, it is possible to suppress the occurrence of dark lines between the linear electrodes 254 at the boundary 290 that are caused by excessive voltage being applied to the second liquid crystal 230 located between the linear electrodes 254 at the boundary 290.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:
1. A liquid crystal display panel, comprising:
a plurality of pixels, each including a pixel electrode provided above a main surface of a substrate, a common electrode provided above the main surface of the substrate, and a liquid crystal that rotates in-plane of the main surface of the substrate due to voltage applied by the pixel electrode and the common electrode, wherein the pixel electrode includes a base line electrode and linear electrodes branched from the base line electrode, the linear electrodes extend to both sides of the base line electrode across the base line electrode, and one end of each linear electrode is not connected to the base line electrode, and when an initial alignment direction of the liquid crystal for which dielectric anisotropy is positive, or a direction perpendicular to the initial alignment direction of the liquid crystal for which dielectric anisotropy is negative is defined as a predetermined first direction, at a boundary between pixels, of the plurality of pixels, that are adjacent to each other, a boundary line between the adjacent pixels, the linear electrodes, and an end side of the each linear electrode at the one end not connected to the base line electrode are inclined with respect to the predetermined first direction, and inclining directions with respect to the predetermined first direction of the boundary line, the linear electrodes, and the end side are identical.

2. The liquid crystal display panel according to claim 1, wherein the end side has a curved shape.

3. A liquid crystal display panel, comprising:
a plurality of pixels, each including a pixel electrode, a common electrode, and a liquid crystal that rotates in-plane due to voltage applied by the pixel electrode and the common electrode, wherein the pixel electrode includes a linear electrode, when an initial alignment direction of the liquid crystal for which dielectric anisotropy is positive, or a direction perpendicular to the initial alignment direction of the liquid crystal for which dielectric anisotropy is negative is defined as a predetermined first direction, at a boundary between pixels, of the plurality of pixels, that are adjacent to each other, a boundary line between the adjacent pixels, the linear electrode, and an end side of the linear electrode are inclined with respect to the predetermined first direction, and inclining directions with respect to the predetermined first direction of the boundary line, the linear electrode, and the end side are identical, and an inclination angle relative to the predetermined first direction of the end side is greater than an inclination angle relative to the predetermined first direction of the boundary line.

4. The liquid crystal display panel according to claim 1, wherein at the boundary between the adjacent pixels, an extension line of a long side of the linear electrode in one of the pixels and an extension line of a long side of the linear electrode in another of the pixels are offset in a direction perpendicular to the predetermined first direction.

5. The liquid crystal display panel according to claim 1, further comprising:
a scanning wiring extending in a zig-zag manner in a predetermined second direction, wherein a shape of the pixels is bent along the scanning wiring.

6. The liquid crystal display panel according to claim 1, wherein at the boundary between the adjacent pixels, when the linear electrode of one of the pixels and the linear electrode of another of the pixels are parallel, a spacing between the linear electrode of the one of the pixels and the linear electrode of the other of the pixels is wider than a spacing of the linear electrode within the pixel.

7. A liquid crystal display device, comprising:
the liquid crystal display panel according to claim 1 that displays a monochrome image; and a color liquid crystal display panel that displays a color image.

8. The liquid crystal display device according to claim 7, wherein each pixel of the plurality of pixels of the liquid crystal display panel emits light on a plurality of pixels of the color liquid crystal display panel.

* * * * *